United States Patent
Andry et al.

(10) Patent No.: US 6,724,449 B1
(45) Date of Patent: Apr. 20, 2004

(54) VERTICAL ALIGNED LIQUID CRYSTAL DISPLAY AND METHOD USING DRY DEPOSITED ALIGNMENT LAYER FILMS

(75) Inventors: Paul Stephen Andry, Mohegan Lake, NY (US); Chen Cai, Hartsdale, NY (US); Kevin Kok Chan, Staten Island, NY (US); Praveen Chaudhari, Briarcliff Manor, NY (US); James Patrick Doyle, Bronx, NY (US); Eileen Ann Galligan, Fishkill, NY (US); Richard Allen John, Yorktown Heights, NY (US); James Andrew Lacey, Mahopac, NY (US); Shui-Chih Alan Lien, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/536,016

(22) Filed: Mar. 27, 2000

(51) Int. Cl.⁷ .............................................. G02F 1/1337
(52) U.S. Cl. .................... 349/124; 349/129; 349/130
(58) Field of Search ................... 349/125, 129, 349/130, 124

(56) References Cited

U.S. PATENT DOCUMENTS

| | | | | |
|---|---|---|---|---|
| 4,437,731 A | * | 3/1984 | Sudo et al. ................... | 349/131 |
| 5,093,741 A | * | 3/1992 | Shohara et al. .............. | 349/130 |
| 5,268,781 A | * | 12/1993 | Shigeta et al. ............... | 349/125 |
| 5,309,264 A | | 5/1994 | Lien et al. | |
| 5,710,609 A | * | 1/1998 | Shimada ....................... | 349/126 |
| 5,745,205 A | * | 4/1998 | Kato et al. .............. | 204/192.15 |
| 5,770,826 A | | 6/1998 | Chaudhari et al. | |
| 5,880,801 A | * | 3/1999 | Scherer et al. ............... | 349/124 |
| 5,907,380 A | | 5/1999 | Lien | |
| 6,426,786 B1 | * | 7/2002 | Lu et al. ....................... | 349/125 |

OTHER PUBLICATIONS

Abstract, Ong et al, "Alignment of Liquid Crystal by inhomogeneous surfaces", J AP Jan. 15, 1985, vol. 57, #2, pp. 186–192.*
Abstract, Hochbaum et al, "Alignment and texture of thin Liquid Crystal films on solid surfaces", J AP Apr. 1982, vol. 53 #4, p. 2998–3002.*
Abstract, Nakamura et al, "Alignment of nematic Liquid Crystal on ruled grating surfaces", JAP Jan. 1981, vol. 52 #1, pp. 21–285.*
Abstract, Hatoh et al, "Molecular tilt direction in a slightly tilted homeotropic aligned Liquid Crystal cell", J AP 110/13/1993, vol. 63 #26, pp. 186–192.*
Sanda et al, "Role of surface bonding on liquid crystal alignment at metal surfaces", Phys Rev A vol. 39, No. 5, pp. 2653–2658, Mar. 1, 1989.*

* cited by examiner

Primary Examiner—Kenneth A Parker
(74) Attorney, Agent, or Firm—Robert M. Trepp, Esq.; McGinn & Gibb, PLLC

(57) ABSTRACT

A liquid crystal display device includes a first substrate, a dry alignment film deposited over the substrate, a second substrate coupled to the first substrate with the dry alignment film deposited over the second substrate therebetween and forming a cell gap, and a liquid crystal material formed in the cell gap. The dry alignment film allows for a truly vertical alignment of molecules of the liquid crystal material such that the molecules form an angle of substantially 90° relative to the substrate. The dry alignment film can be an oxide layer, a nitride layer, an oxynitride layer or a silicon layer. This dry alignment layer can be treated to form a tilted homeotropic alignment, such that the liquid crystal molecules have a pretilt angle of 0.5 to 10 degrees from a substrate normal direction. The truly vertical alignment process can be incorporated with a ridge and fringe field process method to form a multidomain Vertical Alignment (VA) Liquid Crystal Display's (LCDs) which have wide viewing angles.

66 Claims, 30 Drawing Sheets

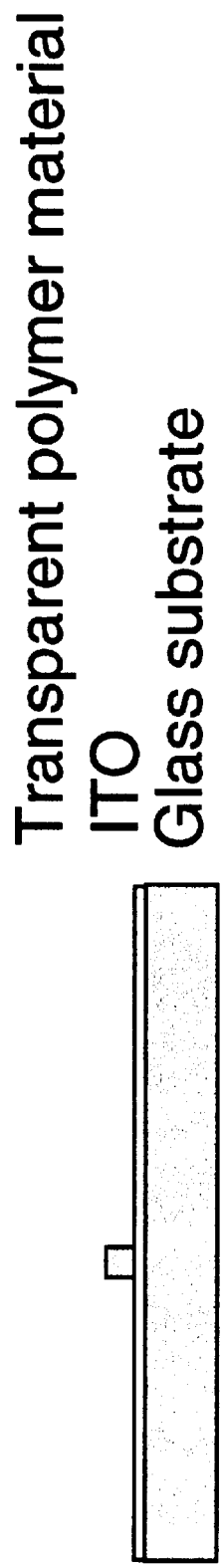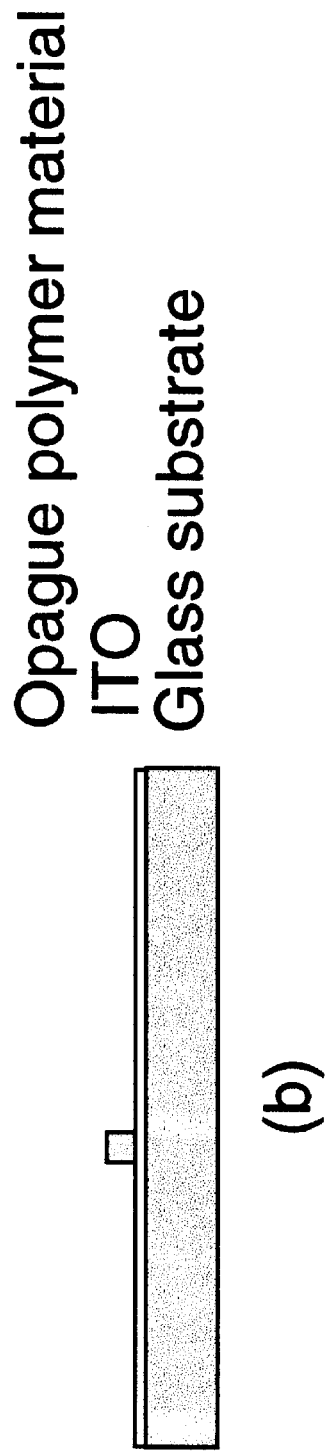
Fig. 5

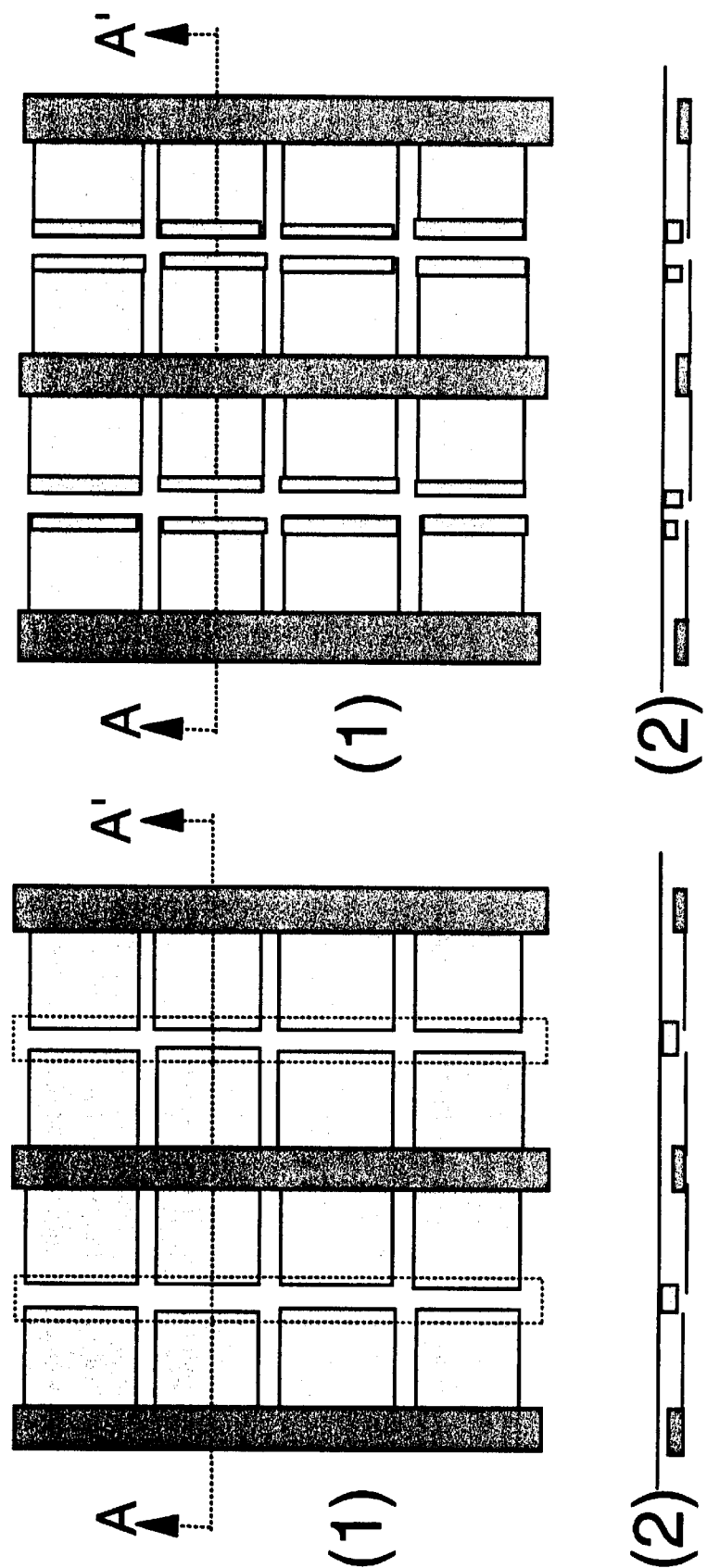

VERTICAL ALIGNED LIQUID CRYSTAL DISPLAY AND METHOD USING DRY DEPOSITED ALIGNMENT LAYER FILMS

CROSS-REFERENCE TO RELATED APPLICATIONS

The present application is related to U.S. patent application Ser. No. 09/323,044 filed on Jun. 1, 1999, to Lu et al., entitled "METHOD OF HOMEOTROPIC ALIGNMENT OR TILTED HOMEOTROPIC ALIGNMENT OF LIQUID CRYSTALS BY SINGLE OBLIQUE EVAPORATION OF OXIDES AND LIQUID CRYSTAL DISPLAY DEVICE FORMED THEREBY" having IBM Docket No. YO999-152, incorporated herein by reference.

BACKGROUND OF THE INVENTION

1. Field of the Invention

The present invention relates to a method of forming a liquid crystal cell for use in a liquid crystal display (LCD) and more particularly to a method of forming a vertically aligned liquid crystal cell using a dry alignment layer.

2. Description of the Related Art

It is well known that the vertical-crystal-aligned (VA) liquid crystal display (LCD) has a good black state, and thus it has a high contrast ratio. VA-LCD has been used in both the direct view thin film transistor-liquid crystal display (TFT-LCD) panel and the liquid crystal projection light valve.

Two types of vertical alignment (VA) are commonly used. One is a "truly vertical alignment" (e.g., liquid crystal molecules are aligned 90° to the substrate surface with zero pretilt). The other is a tilted homeotropic alignment (e.g., liquid crystal molecules are aligned to the substrate surface almost vertically with a small pretilt angle of, for example, 1° to 10°, from the substrate normal). The truly vertical alignment is used for ridge-type, fringe field-type, or ridge and fringe field-type of multi-domain liquid crystal display structures. The tilted homeotropic alignment is used for single domain as well as some multi-domain liquid crystal display structures.

Conventionally, for the ridge type or ridge and fringe-field type of multi-domain liquid crystal structure, after ridges are formed, a homeotropic polyimide is coated to cover the surface area which includes the ridge area. Polyimide usually accumulates thicker near the ridge. This results in light leakage near the ridge. A uniform coating of the alignment material on all surfaces, whether it is on the ridge, near the ridge, or away from the ridge, is required. Silicon oxide or silicon nitride deposited film which gives vertical alignment for the negative dielectric anisotropic liquid crystal, as described below, will solve this problem.

For tilted homeotropic (vertical) alignment, two methods of alignment are usually used. A first method is using two oblique angle silicon monoxide depositions (e.g., the first oblique angle deposition is about 5° and the second oblique angle deposition is about 30°) on the substrate surface followed by a long chain alcohol evaporation on that surface. A second method is using a mechanical rubbing treatment on the homeotropic polyimide film which is coated on the substrate.

However, the first method is complicated and costly. Also, the charge retention is usually poor, on the order of less then 80%, due to the use of the long chain alcohol material.

Furthermore, experimental results show that the stability and consistency of the pretilt angle of the second method is hard to achieve and control.

Further, it is noted that U.S. Pat. No. 5,309,264 to Lien et al. describes how one can use a fringe field produced by the electrode cutouts to make a multi-domain liquid crystal display (LCD) to improve a viewing angle of the conventional LCD.

U.S. Pat. No. 5,907,380 describes another method using fringe field and polymer wall (ridge) to make multi-domain liquid crystal display (LCD) to improve the viewing angle of the conventional LCD. For the above two multi-domain homeotropic liquid crystal displays, a homeotropic (vertically-aligned) polyimide is used as the liquid crystal alignment layer which aligns the liquid crystal vertically at the field-off state.

SUMMARY OF THE INVENTION

In view of the foregoing limitations of the conventional methods and structures, an object of the present invention is to provide a new method and structure in which a truly vertical alignment is achieved and in which a tilted vertical (homeotropic) alignment is achieved.

In a first aspect of the present invention, a liquid crystal display device (and method for forming the LCD) includes a first substrate, a dry deposited vertical alignment layer deposited over the substrate, a second substrate coupled to the first substrate with a dry deposited vertical alignment layer deposited therebetween and forming a cell gap; and a liquid crystal material formed in the cell gap, the dry deposited vertical alignment layer deposited allowing a truly vertical alignment of molecules of the liquid crystal material such that the molecules form an angle of substantially 90° relative to the substrate.

In a second aspect of the present invention, a liquid crystal display device (and a method for forming the same) includes a first substrate, a dry deposited vertical alignment layer deposited over the substrate, followed by an ion beam treatment, a second substrate coupled to the first substrate with the dry deposited vertical alignment layer deposited, followed by an ion beam treatment, therebetween and forming a cell gap, and a liquid crystal material formed in the cell gap, the dry deposited vertical alignment layer and subsequent treatment allowing a tilted vertical alignment of molecules of the liquid crystal material such that the molecules have a pre-tilt angle of 0.5 to 10 degrees from a substrate normal direction.

With the unique and unobvious method and structure of the invention, the present invention can achieve a truly (almost 90°) vertical alignment, and also can achieve a reliable tilted homeotropic liquid crystal alignment with high charge retention.

In a third aspect, a liquid crystal cell (and method for forming the same) includes a first substrate, a pixel electrode disposed above the first substrate, a second substrate, a transparent conductive electrode disposed below the second substrate, a liquid crystal material disposed between the pixel electrode and the transparent conductive electrode, a polymer ridge layer built on the conductive electrode,a dry deposited vertical alignment layer deposited on the first and second substrate. The polymer ridge controls a tilt direction of the liquid crystal material.

In the third aspect, a new structure for a multi-domain homeotropic liquid crystal display is provided. In this new structure, a dry alignment layer (e.g., a dry-deposited film as an alignment layer and without a rubbing treatment) in combination of ridges and/or pixel slit cutouts is used to control the liquid crystal (LC) molecule tilt direction in the pixel to improve the display viewing angle.

This method can be used for both multi-domain LCD's and single-domain LCD's, and is applicable to both high density (e.g., having about 130 dots per inch (DPI) to about 250 DPI) and low density (e.g., having about 30 to less than 130 DPI) liquid crystal displays. It can be used for direct view thin-film-transistor driving liquid crystal displays (TFT-LCD), and it can also be used for liquid crystal light valves (e.g., both transmissive and reflective ones).

Another distinct advantage of this method of inducing alignment, is that the alignment layer in this case may also serve as a passivation layer for the TFT array. It is known that bare metal surfaces exposed directly to PI alignment layers and LC materials can cause instabilities in the final assembled panel over time. For this reason, it is common practice to encapsulate the entire active array using a final layer, almost invariably PECVD silicon nitride. Since the present inventors have established that SiNx, SiOx and any silicon oxynitride SiOxNy having a composition bounded by these two will provide vertical alignment, it is clear that the two distinct steps of array passivation and alignment layer deposition can be combined into one single cost-saving step.

BRIEF DESCRIPTION OF THE DRAWINGS

The foregoing and other purposes, aspects and advantages will be better understood from the following detailed description of a preferred embodiment of the invention with reference to the drawings, in which:

FIGS. 5A–5B illustrate structures for building an electrode wall;

FIGS. 20A–24 illustrate new square LC cell designs;

FIGS. 26A-30 illustrate a new square LC cells for a reflective display designs.

DETAILED DESCRIPTION OF PREFERRED EMBODIMENTS OF THE INVENTION

Figure 1:
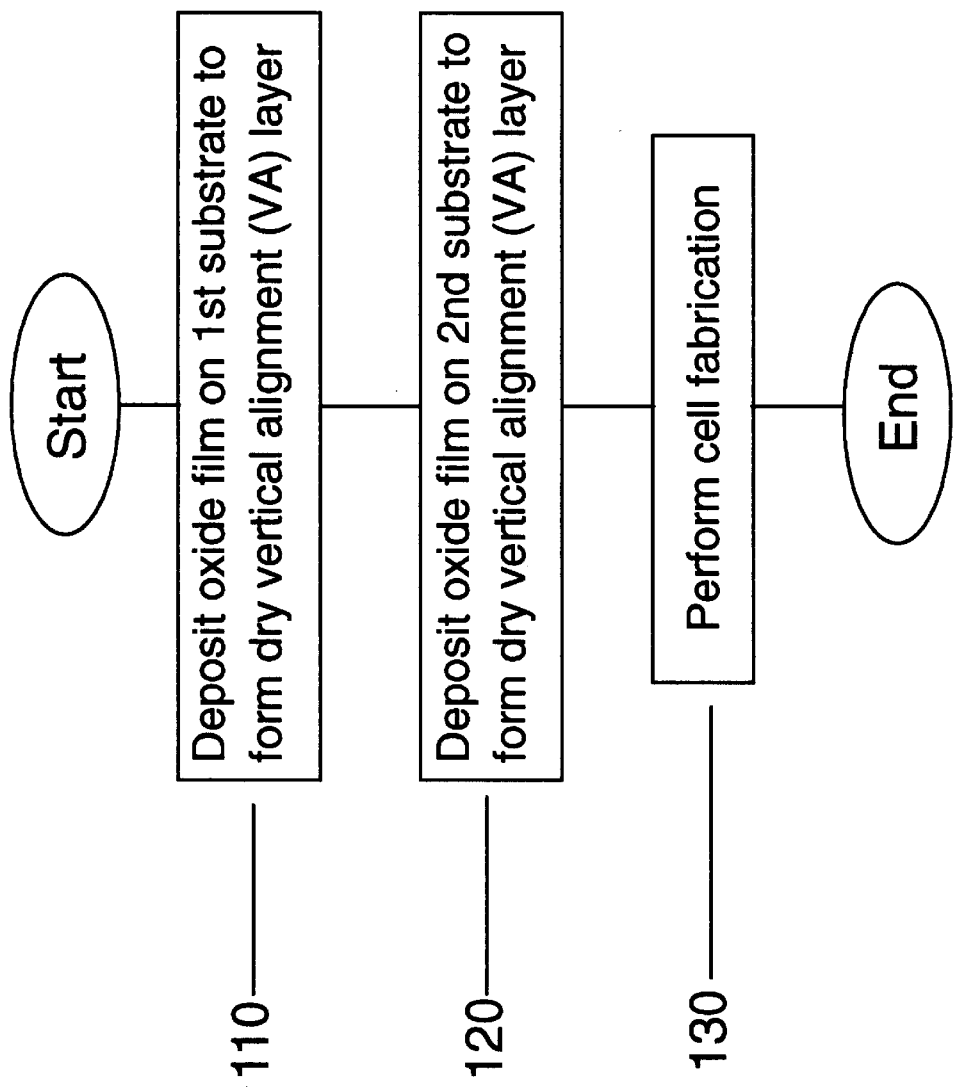
FIG. 1A illustrates a flow diagram of a method 100 of forming a structure for achieving a truly vertical alignment.
FIG. 1B illustrates a structure produced by the method of FIG. 1A.
Figure 1:
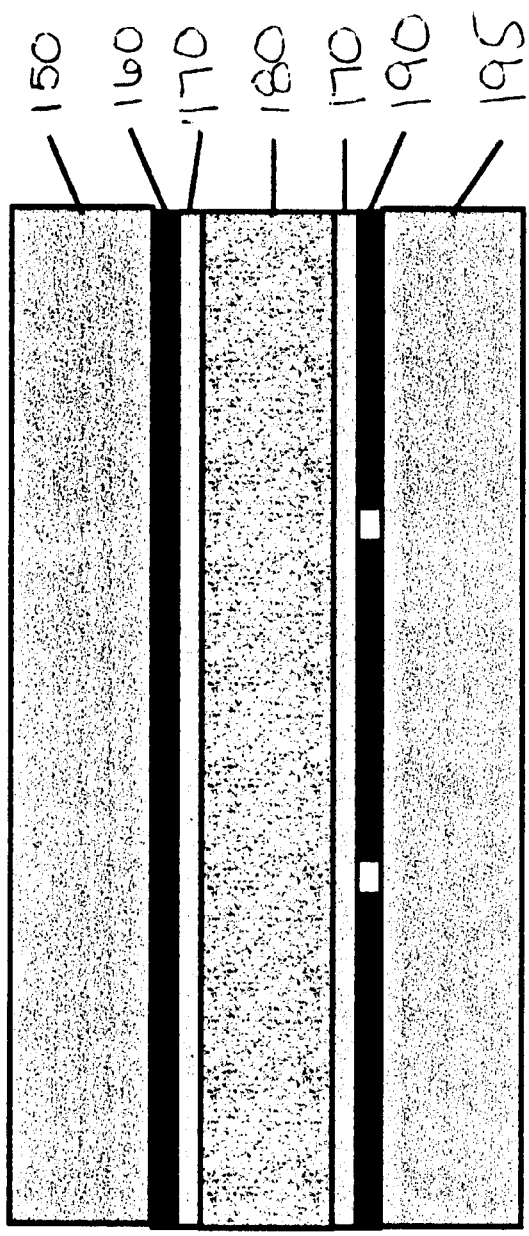

Referring now to the drawings, and more particularly to FIGS. 1A–30, there are shown preferred embodiments of the method and structures according to the present invention.

First Preferred Embodiment
Truly Vertical Alignment

Turning to FIG. 1A, regarding a method 100 for producing a structure having truly vertical alignment (e.g., almost 90°), in step 110, a substrate 150 (e.g., a glass substrate, quartz substrate, silicon-based substrate, plastic substrate, transparent substrate, reflective substrate, TFT substrate, any of these substrates with driving circuitry on it or any other suitable substrate) is deposited with a dry deposited vertical alignment film by one of the following deposition methods.

That is, a first deposition method includes a normal direction e-beam evaporation of silicon oxide film, in which the evaporant is $SiO_2$, and the electron gun ("E gun") voltage is 7 kev. The preferred angle of the evaporant source to the substrate surface is 90°±5°, and the deposition rate is 3 Å/s. Preferably, the deposition pressure is approximately 1.5 e–6 torr. During deposition, the substrate temperature is at room temperature. The film thickness of the silicon dioxide is from approximately 100 Å to about 2000 Å.

A second deposition method involves silicon oxide deposition in a chemical vapor deposition (CVD) system. The reaction includes

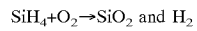

$$SiH_4 + O_2 \rightarrow SiO_2 \text{ and } H_2$$

at a deposition temperature of approximately 300° C., and at a pressure of about 150 mtorr. The silicon dioxide film thickness is substantially within a range from about 100 Å to about 2000 Å.

In a third deposition method, a sputtering of silicon oxide is performed in a radio frequency (RF) sputtering system. The source is preferably $SiO_2$ and the preferred angle of incidence to the substrate surface is 90°±5°. The target voltage is preferably at 2000V, with about 50V bias on the substrate. The sputtering total pressure is about 20 mtorr with about 10% of oxygen in an argon gas. During deposition, the substrate temperature may range from room temperature to approximately 180° C. The deposition rate preferably is 20 Å/min.

In a fourth deposition method, silicon oxide (SiOx) is deposited on the substrate in a plasma-enhanced CVD (PE-CVD) system. Preferably, the substrate temperature is substantially within a range of about 200° to about 350° C., using RF power ranging from about 200 W to 1000 W, and with flows of 10 sccm to 50 sccm for $SiH_4$ with a preferred flow of 50 sccm and flows of 500 sccm to 1000 sccm for $N_2O$ with a preferred flow of 800 sccm at about 1.0 Torr for about 3 minutes. The preferred temperature for deposition onto patterned PI ridges is 200° C. Under the most preferred conditions, the deposition time yields a thickness of about 1000 Å, n=1.46@633 nm. The silicon oxide film thickness in the range from about 300 to about 1000 Å all give vertical alignment.

In a fifth deposition method, a silicon nitride (SINx:H) deposition onto the substrate is performed in a PE-CVD system. Preferably, the substrate temperature is substantially within a range of about 200 to 350° C., using RF power ranging from about 200W to 1000W, with flows from 10 sccm to 50 sccm for $SiH_4$ with a preferred flow of 50 sccm and with flows from 100 sccm to 300 sccm for $NH_3$ with a preferred flow of 150 sccm and flows from 500 sccm to 1000 sccm for $N_2$ with a preferred flow of 800 sccm at about 0.5 Torr for about 7 minutes. These deposition conditions yields a silicon nitride film thickness of about 1000 Å, n=1.83@633 nm.

In a sixth deposition method, a silicon oxynitride (SiOxNy:H) deposition onto the substrate is performed in a PE-CVD system. Preferably the substrate temperature is substantially within a range of about 200 to about 350° C., using RF power ranging from about 200 W to 1000 W, with flows of about 10 sccm to 50 sccm for $SiH_4$, flows from 100 sccm to 300 sccm for $NH_3$, flows from 500 sccm to 1000 sccm for $N_2$, and flows from 500 sccm to 1000 sccm for $N_2O$. Pressure should range from about 0.5 Torr to 1.0 Torr, and deposition time should range from 1 to 10 minutes. The most preferred process depends on the final stoicheometry desired and is primarily determined by the ratio of $N_2O$/$NH_3$. The index of the film should fall between the limits of n=1.46 (pure oxide) to about n=1.85 (pure nitride)@633 nm.

Thereafter, in step 120, the dry vertical alignment layer 170 is deposited on a transparent substrate which may have a color filter layer on it.

Then, in step 130, a regular cell fabrication process (e.g., including such steps as seal glue application on one of the substrates, spraying a spacer on the other substrate, assembling and pressing the structure, etc.) is performed to assemble the above two substrates together to form an assembled empty cell. The empty cell is then filled with a negative dielectric anisotropic LC material 180, such as 95465 and/or MLC2039 both from Merck Chemical Company, and sealed. The cell gap is preferably within a range of about 1 μm to about 10 μm.

The finished structure is shown in FIG. 1B including transparent substrate 150, a conductive electrode 160 a dry vertical alignment layer 170, a liquid crystal 180, another dry vertical alignment layer 170, a pixel electrode driving circuit layer 190, and a transparent or non-transparent substrate 195.

Tilted Vertical (Homeotropic) Alignment

Figure 2:
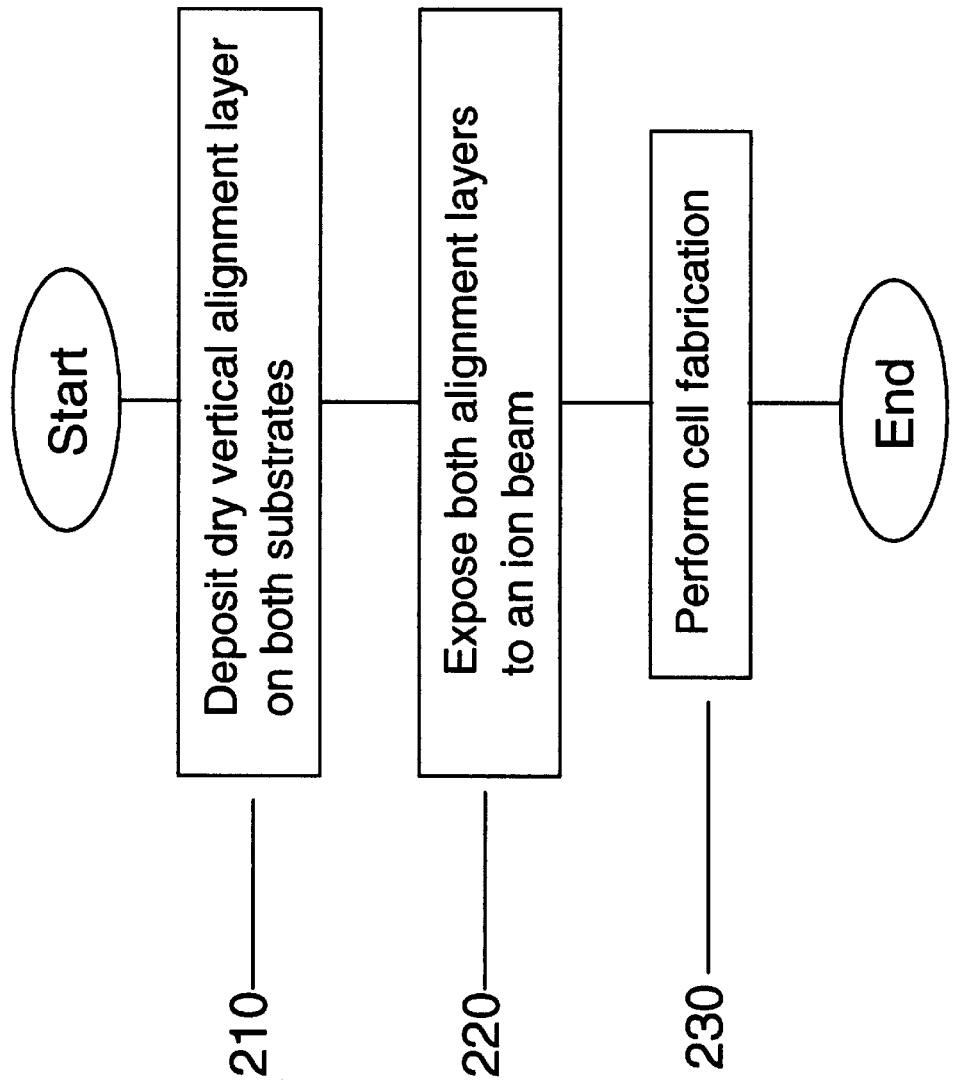
FIG. 2 illustrates a flow diagram of a method 200 of forming a structure for achieving a tilted vertical (homeotropic) alignment.

Referring now to FIG. 2, a second aspect of the first preferred embodiment of the present invention will be described.

The basic principle of vertical alignment is using an ion beam to treat the truly vertical aligned surface which is described above (e.g., as shown in FIGS. 1A–1B) to obtain a proper pretilt angle.

In U.S. Pat. No. 5,770,826, incorporated herein by reference, a liquid crystal planar alignment method is disclosed, which is achieved by an ion beam treatment on the polyimide film coated on the substrate.

However, in the second preferred embodiment of the present invention, first in step 210, both substrates (a glass substrate, quartz substrate, silicon base substrate, plastic substrate or any other suitable substrate) are coated with a truly vertical alignment material, as described above with regard to step 110 in FIG. 1A.

The coated truly vertical (homeotropic) alignment film will provide the liquid crystal a vertical alignment (e.g., the long axis of liquid crystal molecules are perpendicular to the substrate surface).

Then, in step 220, the homeotropic alignment film is bombarded by an ion beam. The ion beam source can be any ion beam such argon, oxygen, nitrogen, helium or others. The incident angle of the ion beam to the substrate surface can be set from between about 5° to about 85°. The energy of the ion beam preferably is from about 25 eV to about 500 eV. The bombardment time is from about 5 seconds to a few minutes.

The treatment of the ion beam to the homeotropic alignment surface is for causing the liquid crystal molecules to tilt a few degree (typically 0.5° to 10°) away from the substrate normal direction uniformly. Thus, the ion-beam-treated homeotropic alignment film achieves the tilted homeotropic liquid crystal alignment.

Then, in step 230, cell fabrication is performed by assembling together two ion-beam-treated homeotropic aligned substrates. A negative dielectric anisotropic liquid crystal is filled to the panel to form a tilted homeotropic liquid crystal display. The twist angle of the display can be from 0 to 270° depending on the angle made by the ion beam bombardment directions on the two substrates.

The inventive truly vertical or tilted homeotropic alignment technical can be used for direct view TFT-LCD, or for a projection display. It can be used for either a transmissive display or a reflective type of display.

Thus, in the first aspect of the invention, the invention overcomes the limitations of the conventional techniques in which, for the truly vertical alignment, homeotropic polyimide is commonly used. That is, the method of the invention prevents, for multi-domain liquid crystal displays, thicker accumulation of polyimide near the ridge if ridge structure is used, and thus the invention minimizes, if not entirely prevents, light leakage near the ridge. Thus, the dry deposition of the vertical alignment film having a uniform deposition is provided by the invention.

Moreover, for tilted homeotropic (vertical) alignment, the invention does not require using a plurality of oblique angle silicon monoxide depositions on the substrate surface followed by a long chain alcohol evaporation on that surface. Instead, a single evaporation may be performed at a 90 degree alignment deposition using normal E-beam, normal sputtering, CVD, or PECVD process techniques.

Hence, the inventive method described above with a dry deposition of the alignment layer followed by the ion beam treatment will achieve a reliable tilted homeotropic liquid crystal alignment with high charge retention.

Second Preferred Embodiment

FIGS. 3A–3B show the structure of the conventional rectangular LCD cell of a TFT-LCD panel. FIG. 3A is a top view and FIG. 3B is a side view along A–A' cross-section. For simplicity, only the pixel electrode 301, and the gate and data bus lines, respectively, are shown. The TFT devices, the top plate electrode and color filter are not shown.

The top plate electrode (not shown) preferably is a continuous Indium tin oxide (I TO) electrode. In FIG. 3A, the polyimide (homogeneous or homeotropic) alignment layers (not shown) are used as liquid crystal alignment layers. This design is a single domain design which has a narrow viewing angle.

FIGS. 4A–4B illustrate a LCD cell design according to the second embodiment of the present invention. The structure of FIGS. 4A–4B is the same as that of FIGS. 3A–3B except that there is a polymer wall 401 (ridge) located on the top plate electrode in the middle of each pixel, and the dry vertical alignment film (not shown in FIG. 4a) which covers both the top and bottom substrate including the ridge 401 is used as an alignment layer.

As shown in FIGS. 5A–5B, two structures can be used as the ridge 401. That is, the first structure is shown in FIG. 5A, in which a transparent polymer material is deposited on top of the ITO electrode and then patterned to various patterns which will be described below.

A second structure is shown in FIG. 5B, in which an opaque polymer material is deposited on top of the ITO electrode and then patterned to various patterns which will be described below.

For both structures, the side wall of the polymer material is recommended to be tapered etched from 10 to 80 deg. with a preferred etch using a photlithographic etching method. The height of the polymer wall is preferably from 20% to about 80% of the cell gap (e.g., the distance between the first and second substrates forming the walls of the cell). The width of the polymer wall is preferably smaller than about three times the cell gap.

After the polymer ridges 401 are formed on the top of ITO electrode on the color filter (e.g., for some structures, such as FIGS. 10, 12, 14, 16, 18, 21 and 27), and also on top of the TFT substrate. Both the TFT substrate and the color filter substrate, including the ridge structure, are coated with a dry vertical alignment layer using one of the following methods.

That is, in a first deposition method, a diamond-like-carbon (DLC) film is deposited using CVD or a sputtering method, followed by a fluorinated DLC (known hereafter as FDLC). More particularly, DLC is preferably PECVD deposited at about 200 mTorr, using flows of approximately 50 sccm $H_2$ and 200 sccm of 5% $C_2H_2$ in He at a radio frequency (RF) power of about 200W. The deposition rate under these conditions is preferably close to about 100 Å/min. The surface may then be post-fluorinated to give vertical alignment using a 30 sec, pure $CF_4$ plasma at a power ranging from about 300 to about 500 Watts.

Other deposition methods may be employed which are the same as the first through fifth deposition methods described above with regard to forming a truly vertical alignment for a dry deposited alignment film on a substrate.

After the dry vertical alignment layer is deposited on both TFT and color filter substrates, a regular cell fabrication process is performed as described above in the first embodiment.

Figure 4:
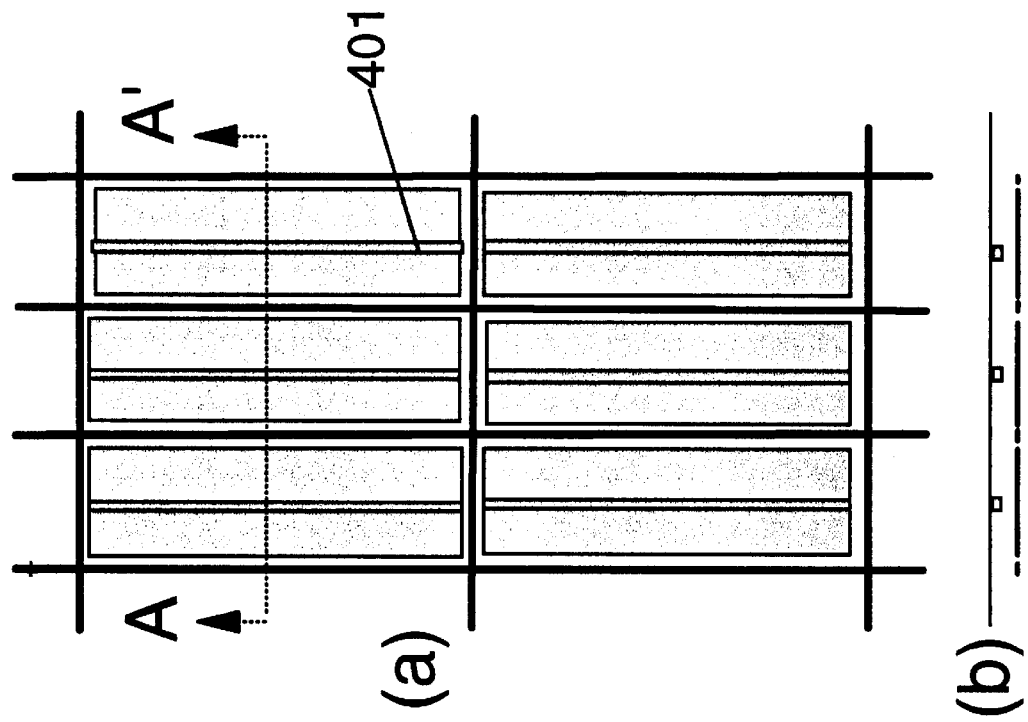
FIG. 4 illustrates an LCD according to a second embodiment of the present invention.
Figure 3:
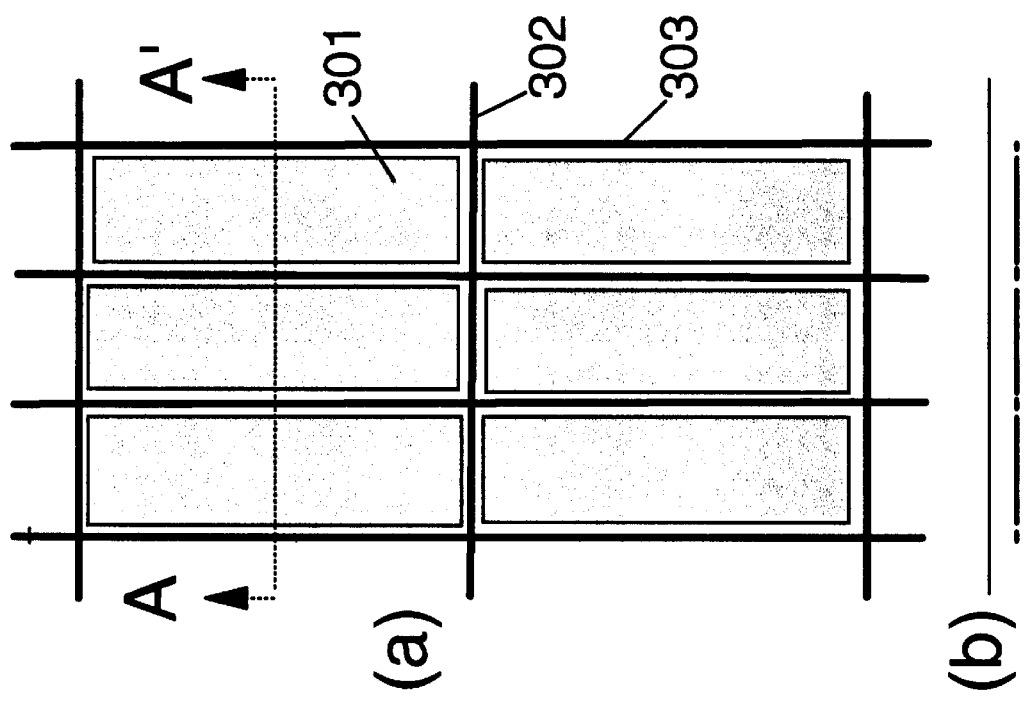
FIG. 3 illustrates a conventional rectangular LCD cell.
Figure 6:
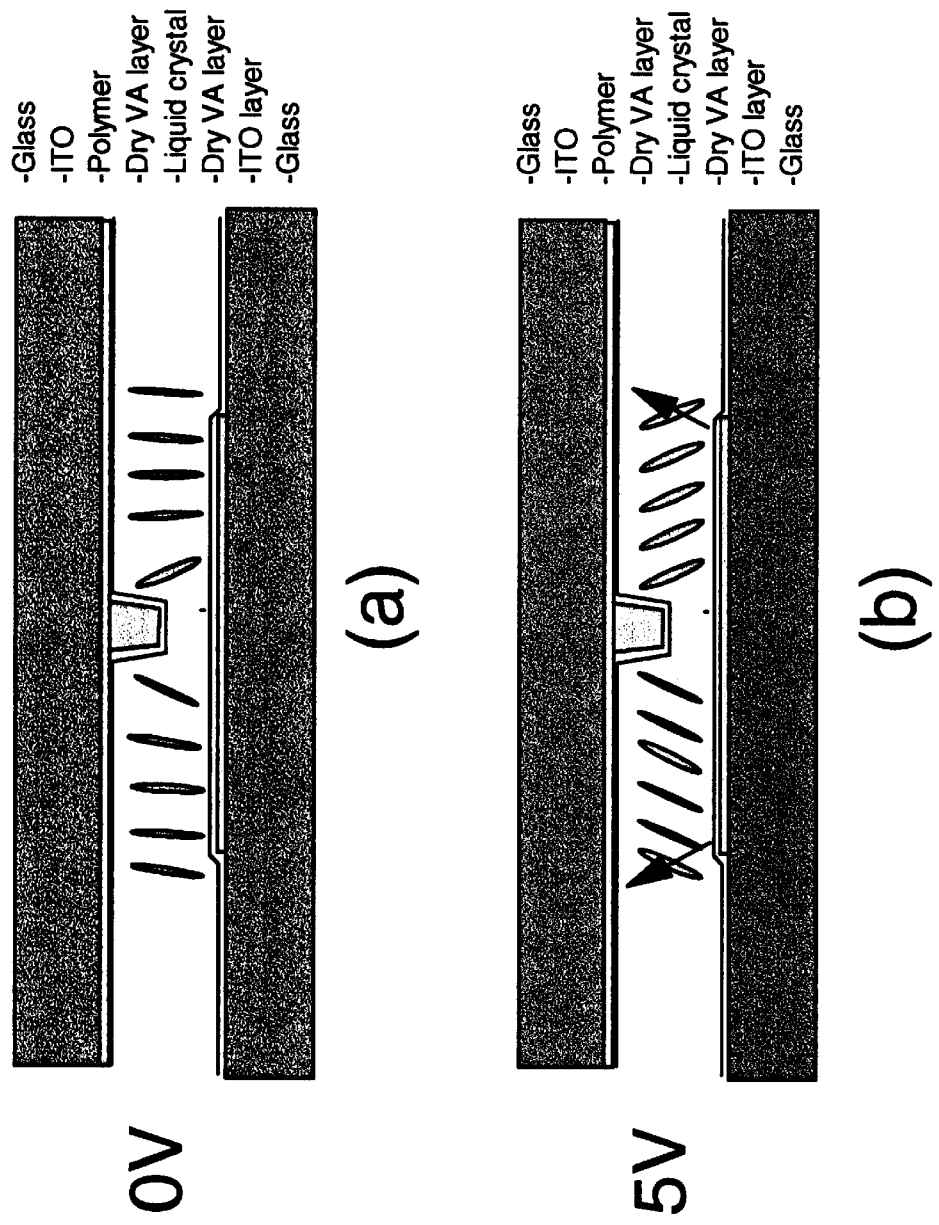
FIGS. 6A–6B illustrate cross-sectional views of multi-domain structures.

FIGS. 6A–6B show a cross-section of the multi-domain structure constructed in FIG. 4 which employs a dry vertical alignment layer. When no voltage is applied, liquid crystal molecules are aligned perpendicular to the substrate surface except in the vicinity of the ridge. The liquid crystal (LC) molecules in the vicinity of the ridge are slightly tilted away from the substrate normal direction. This is because the homeotropic alignment layer on the slope of the ridge also tends to align LC molecules to be perpendicular to the slope and this in conjunction with the collective effect of the liquid crystal makes the LC molecules in the vicinity of the ridge to be tilted in the direction as given in FIG. 6A. When a voltage is applied, the fringe electric field from the pixel edge combined with ridge effect drives the LC molecules in different areas of the pixel tilted in different directions in a controllable manner as shown in FIG. 6B. Thus, a wide viewing angle can be achieved.

Other rectangular pixel designs with polymer walls and/or special pixel ITO cutout designs are shown in FIGS. 7–18. In FIGS. 10, 12, 14, 16 and 18, not only the color filter top plate has polymer walls, but also the TFT bottom plate has polymer walls. In FIGS. 11, 13, 15, and 17, transparent pixel electrodes on the TFT substrate have a special pattern.

Figure 7:
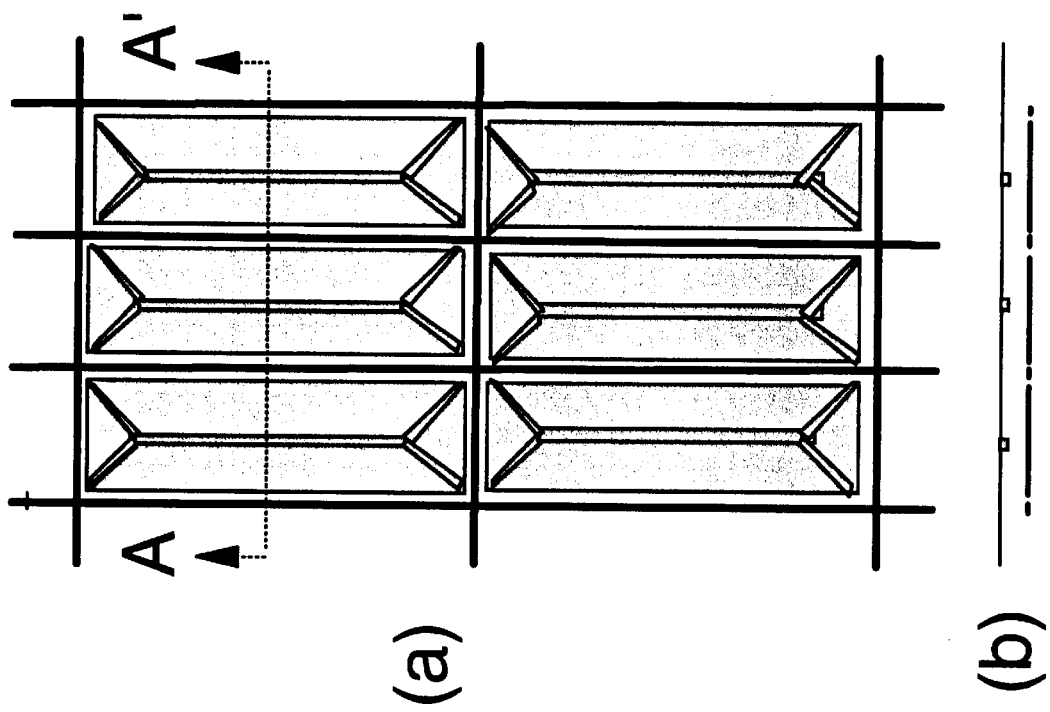
FIGS. 7–18 illustrate other new LCD cell designs.
Figure 8:
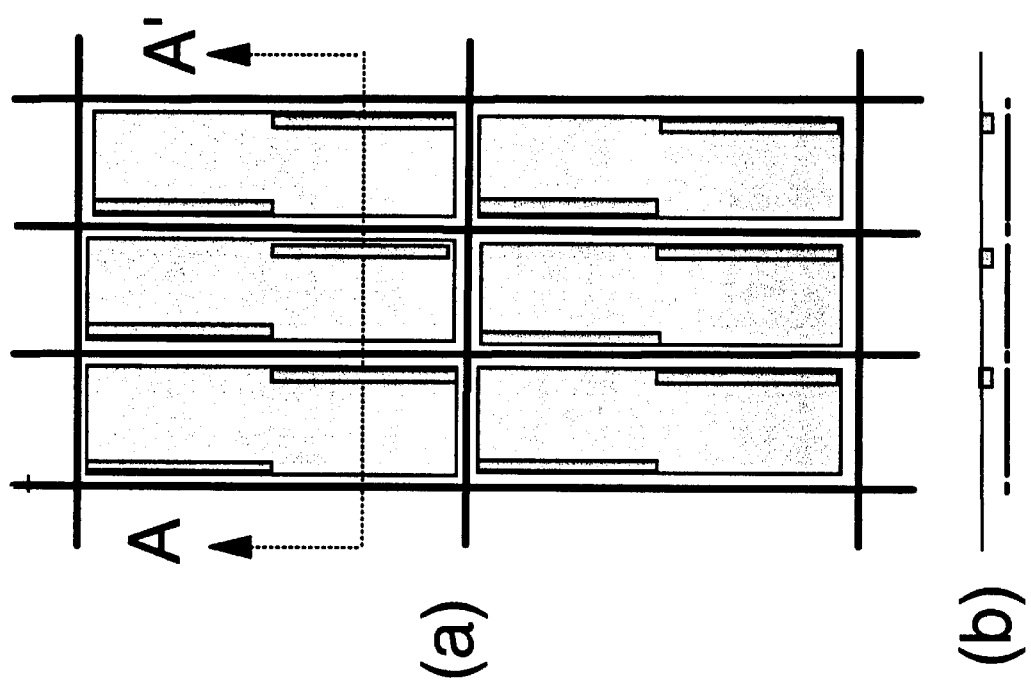
Figure 9B:
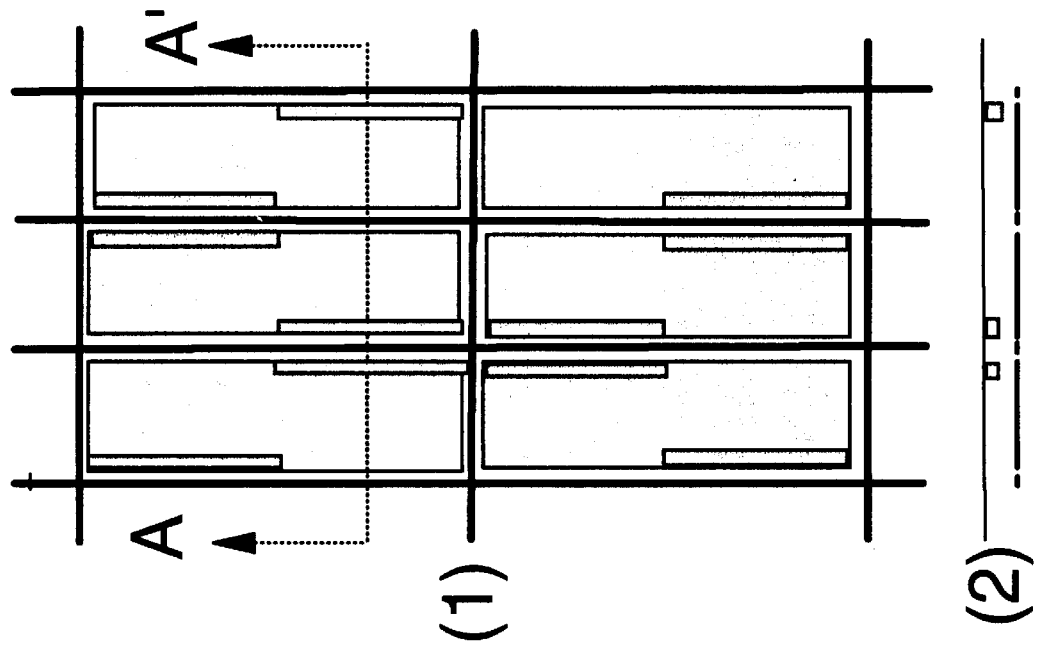
Figure 9A:
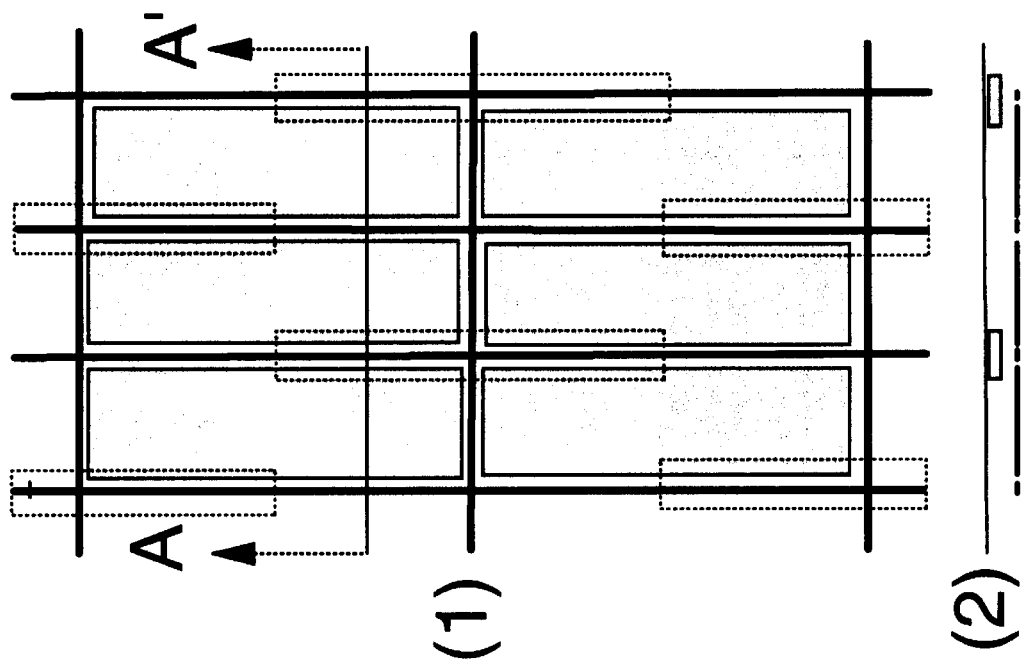
Figure 10A:
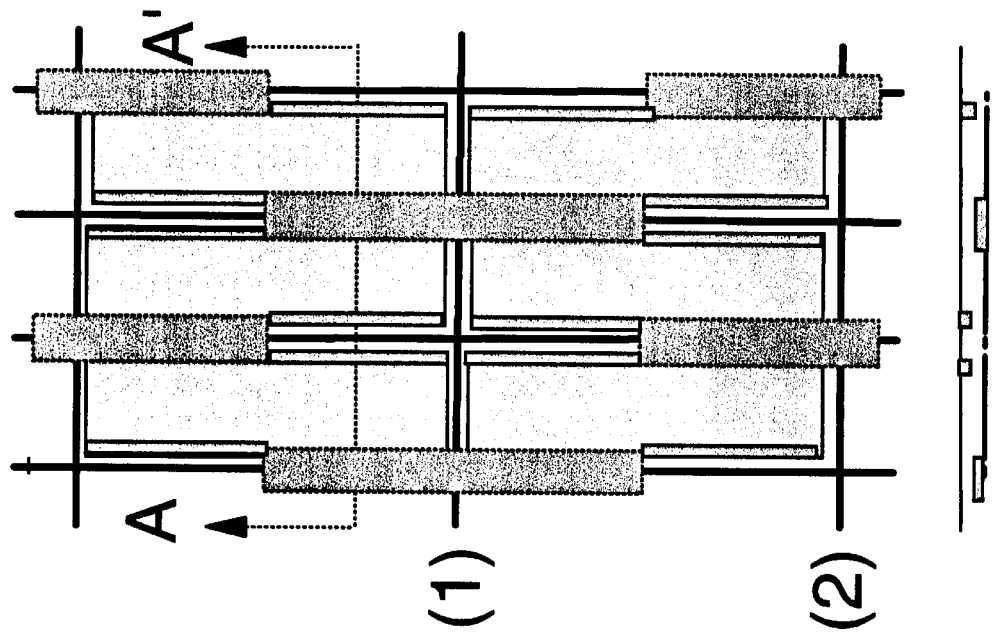
Figure 10B:
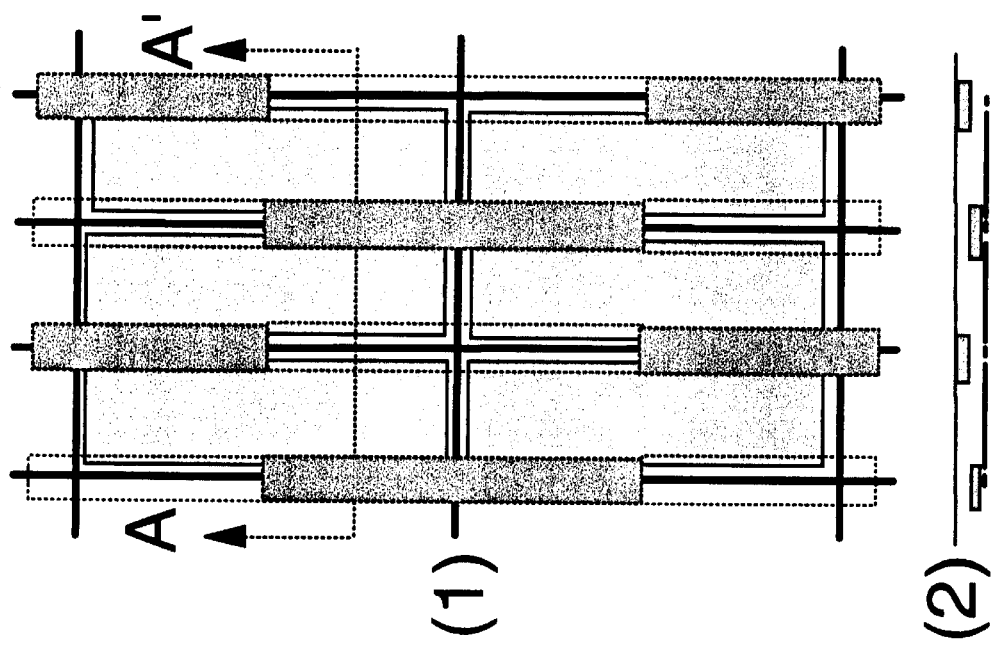
Figure 11:
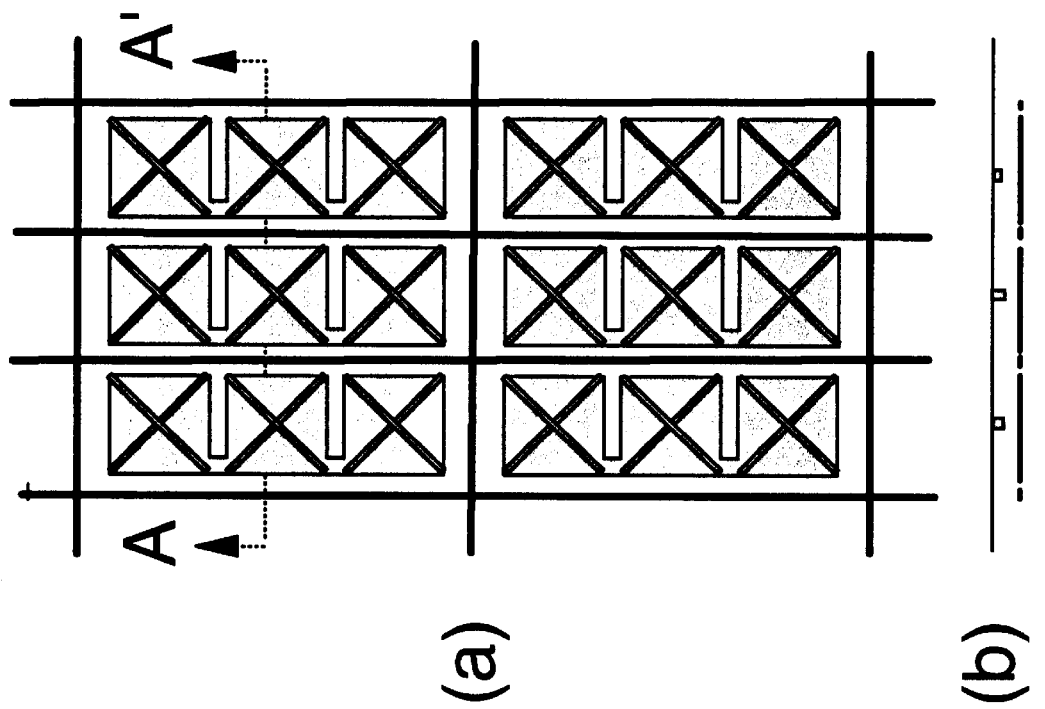
Figure 12:
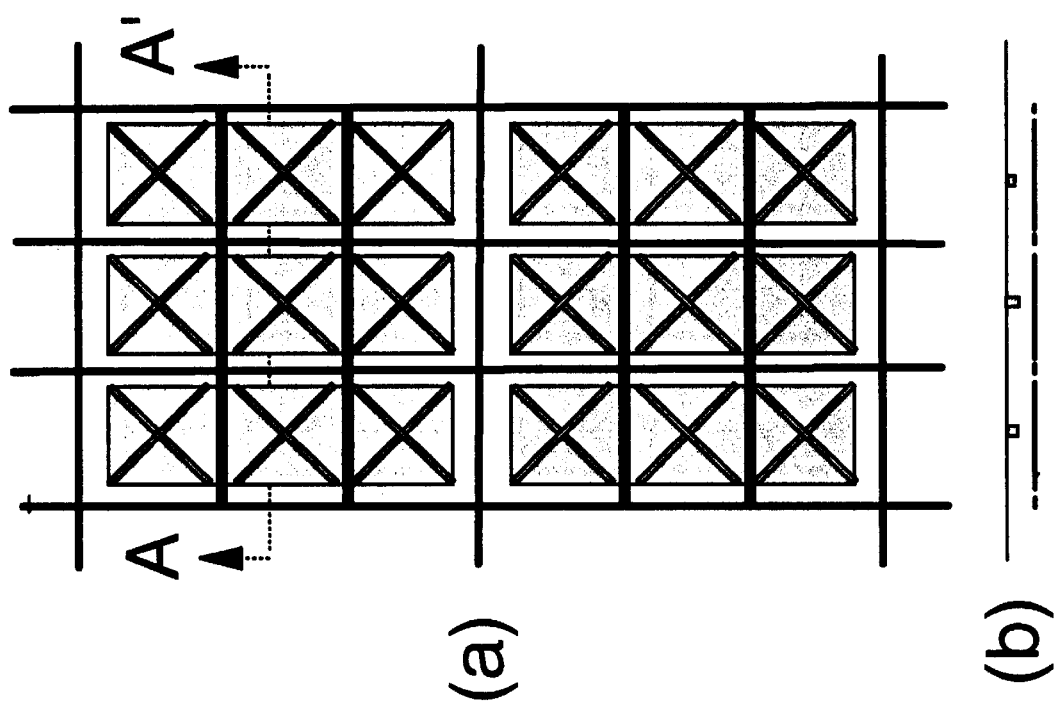
Figure 13:
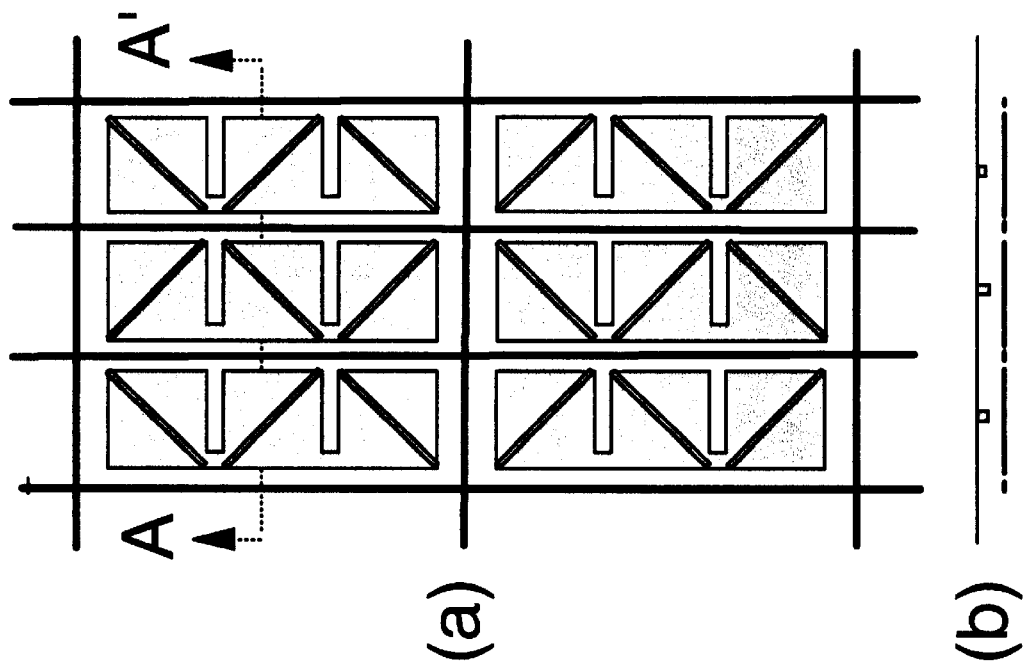
Figure 14:
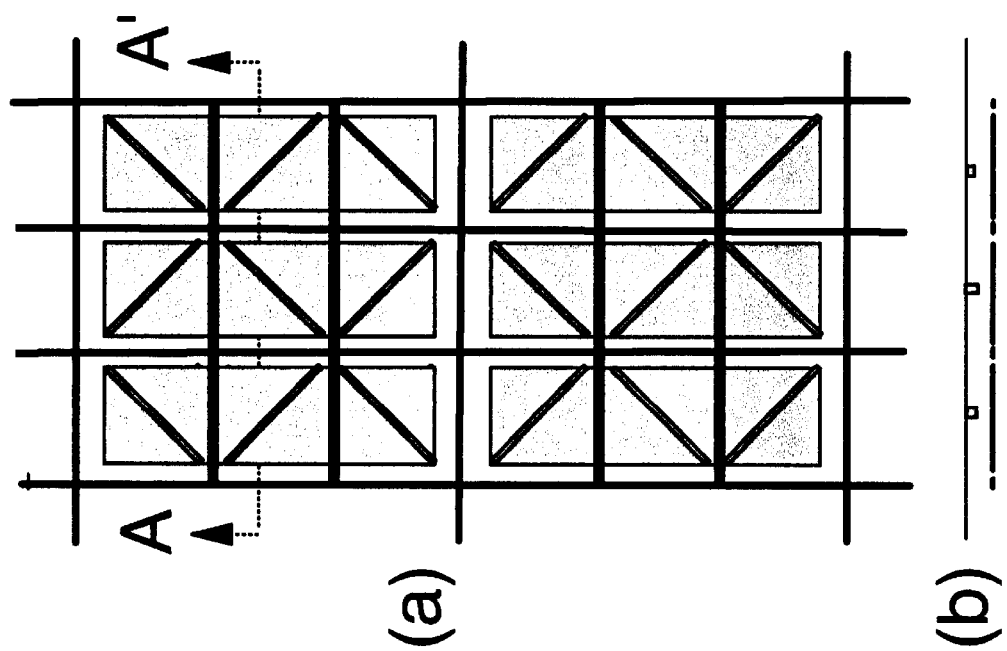
Figure 15:
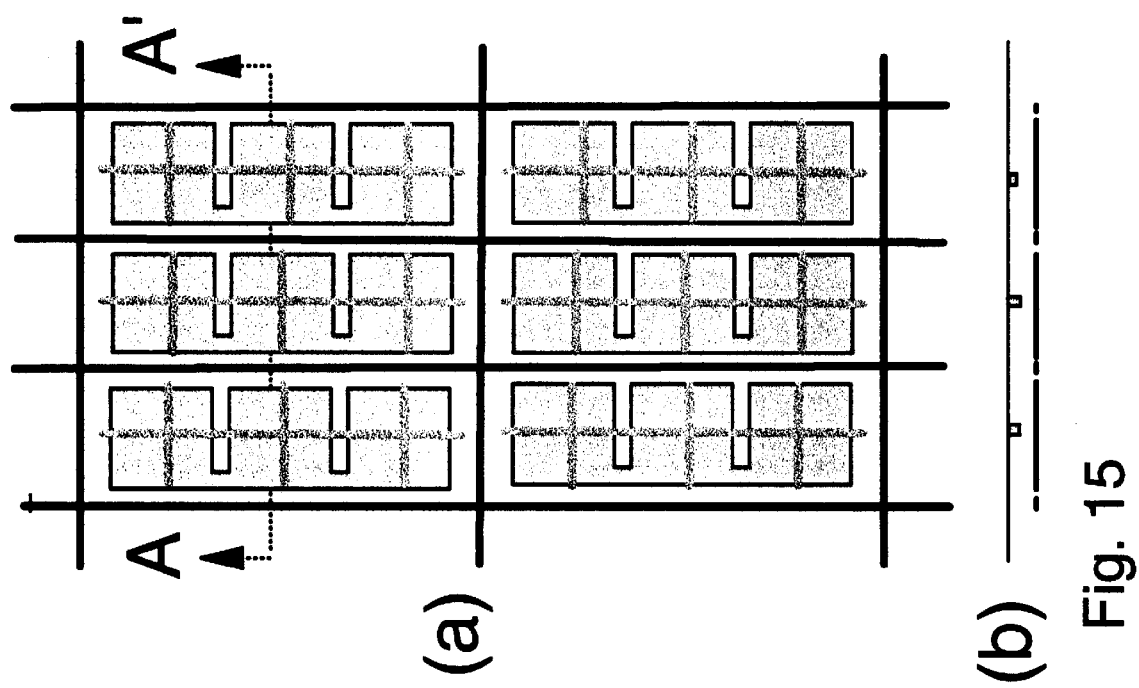
Figure 16:
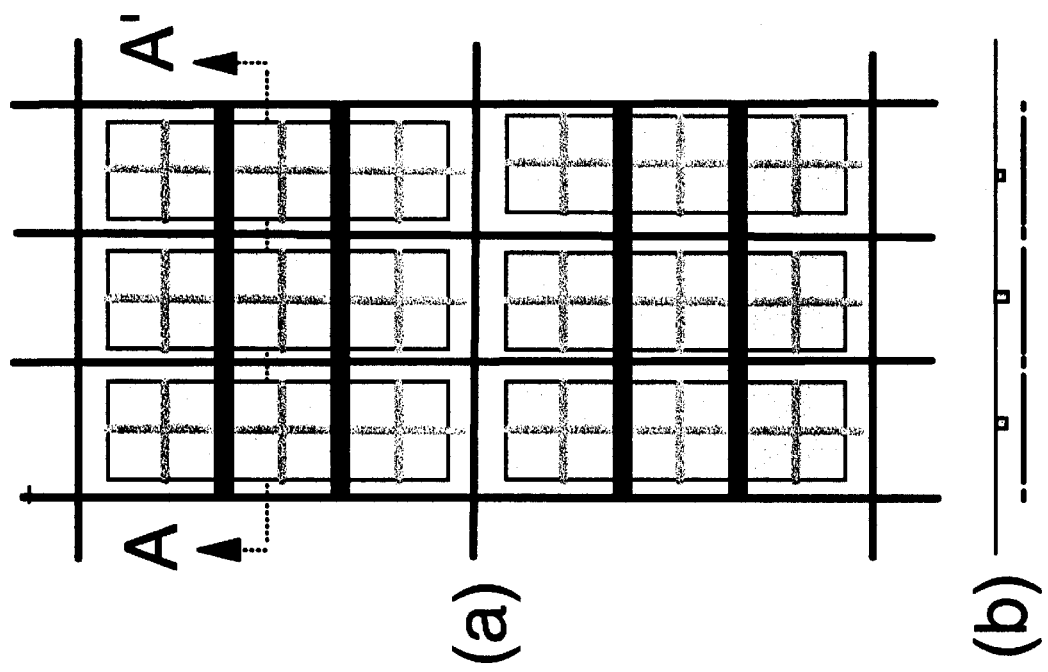
Figure 17:
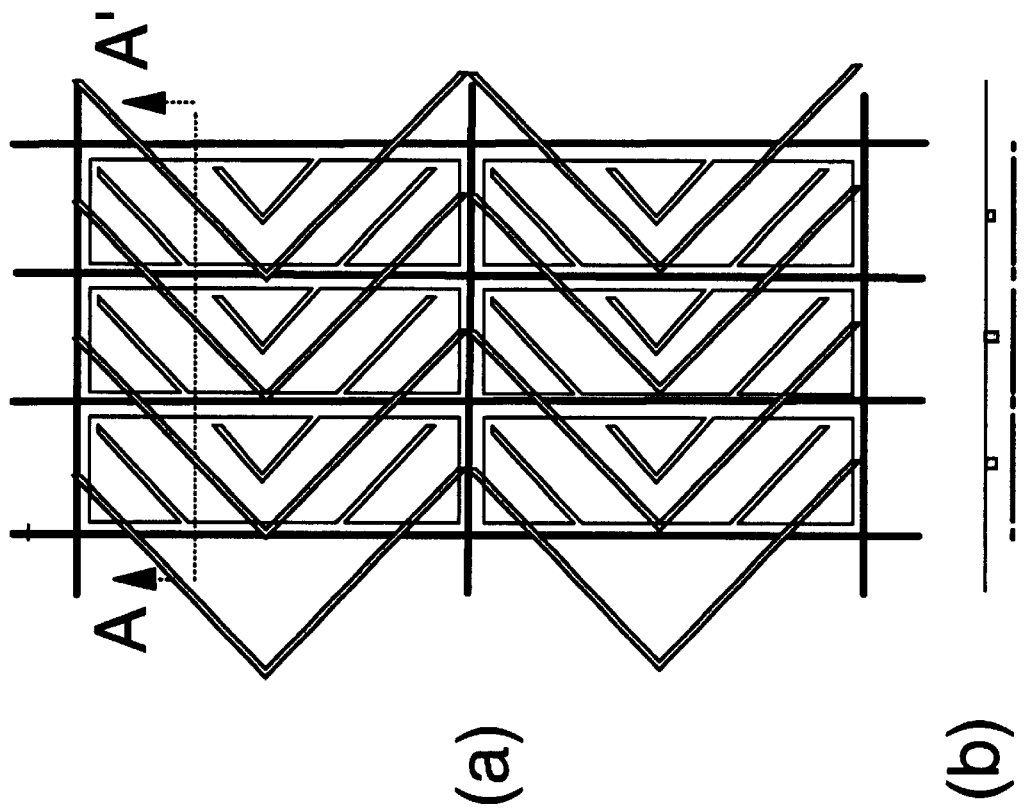
Figure 18:
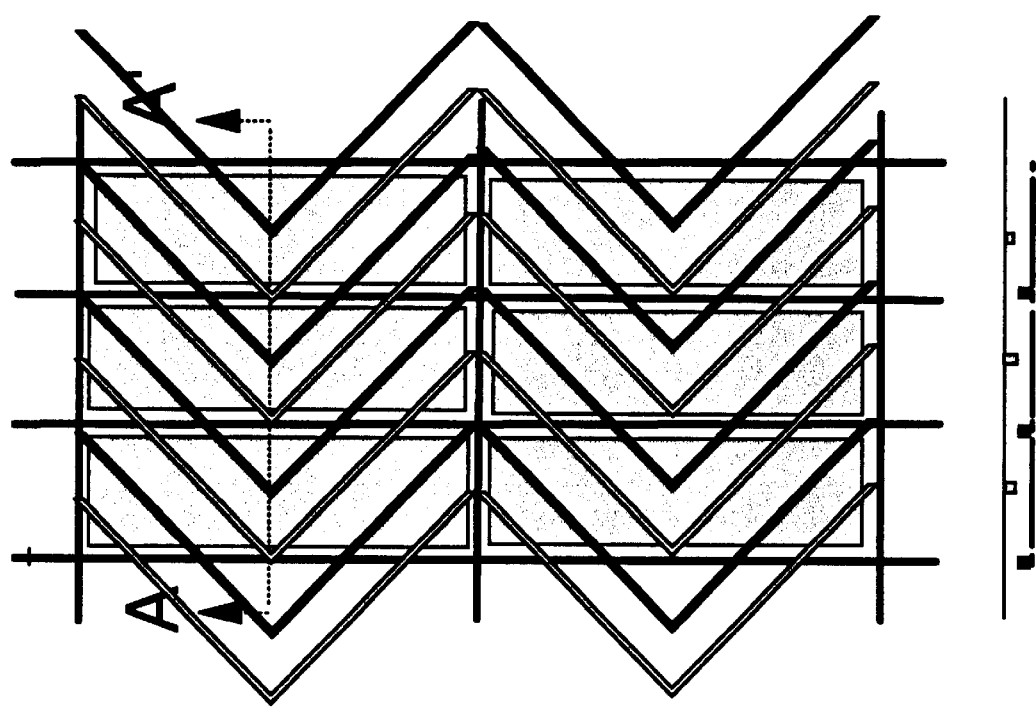

FIG. 7 shows a Y-inverse Y structure and is a four-domain design. Indeed, two Y-inverse Y structures for each pixel can also be used for the rectangular pixel as well. (FIGS. 11, 12, 15, 16, 17, and 18 are for equal four-domain designs).

Figure 19:
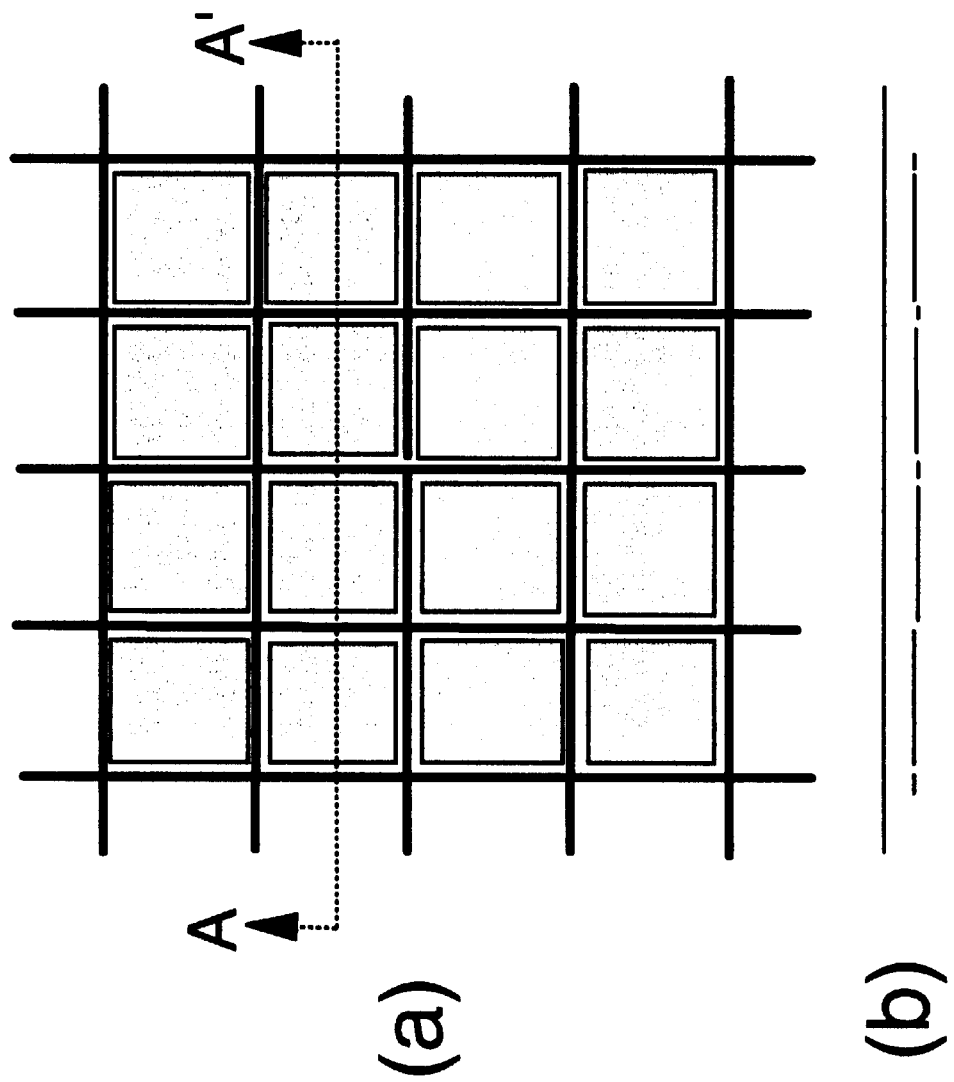
FIG. 19 illustrates conventional square LC cells.
Figure 20:
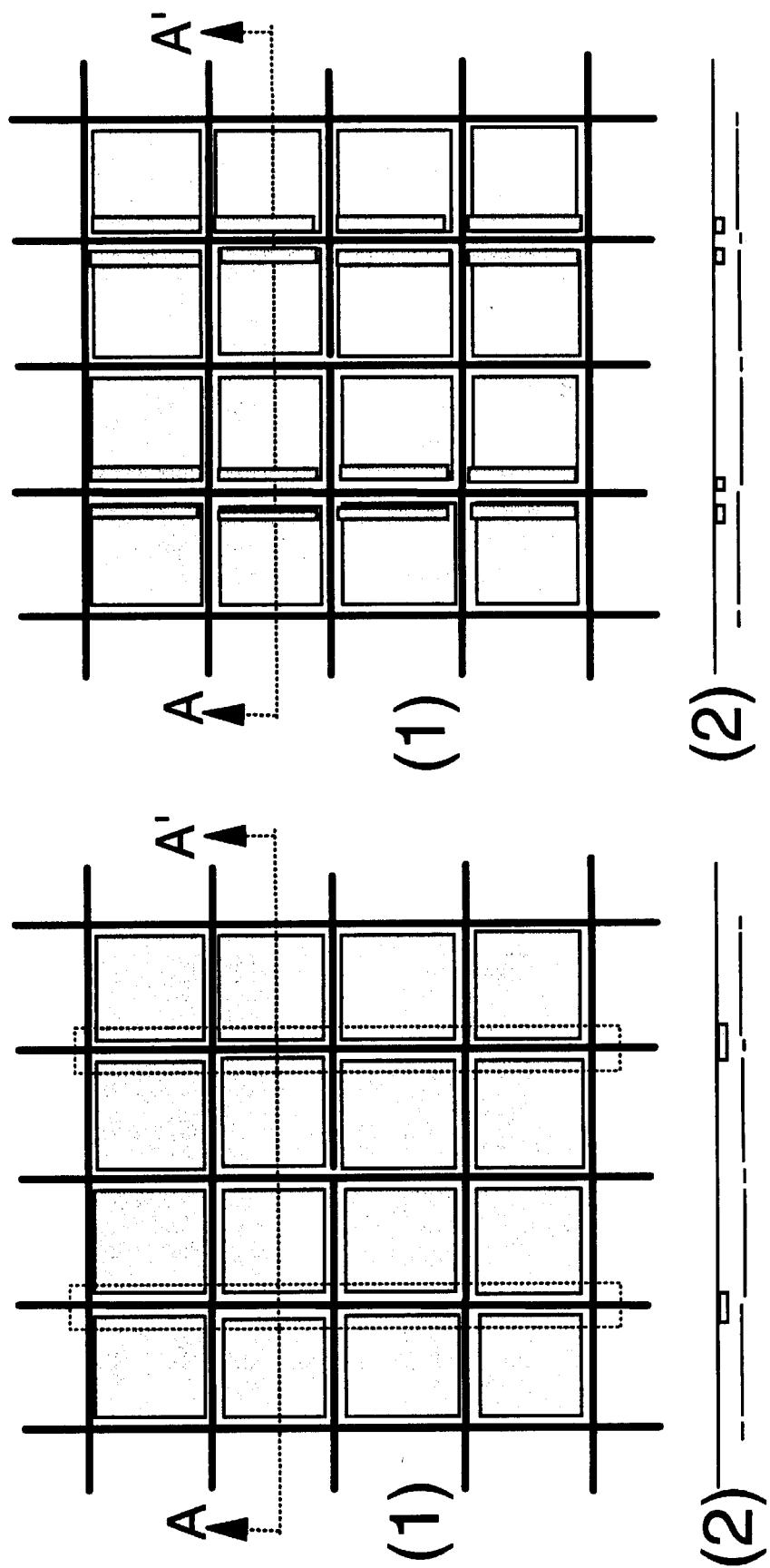
Figure 21:
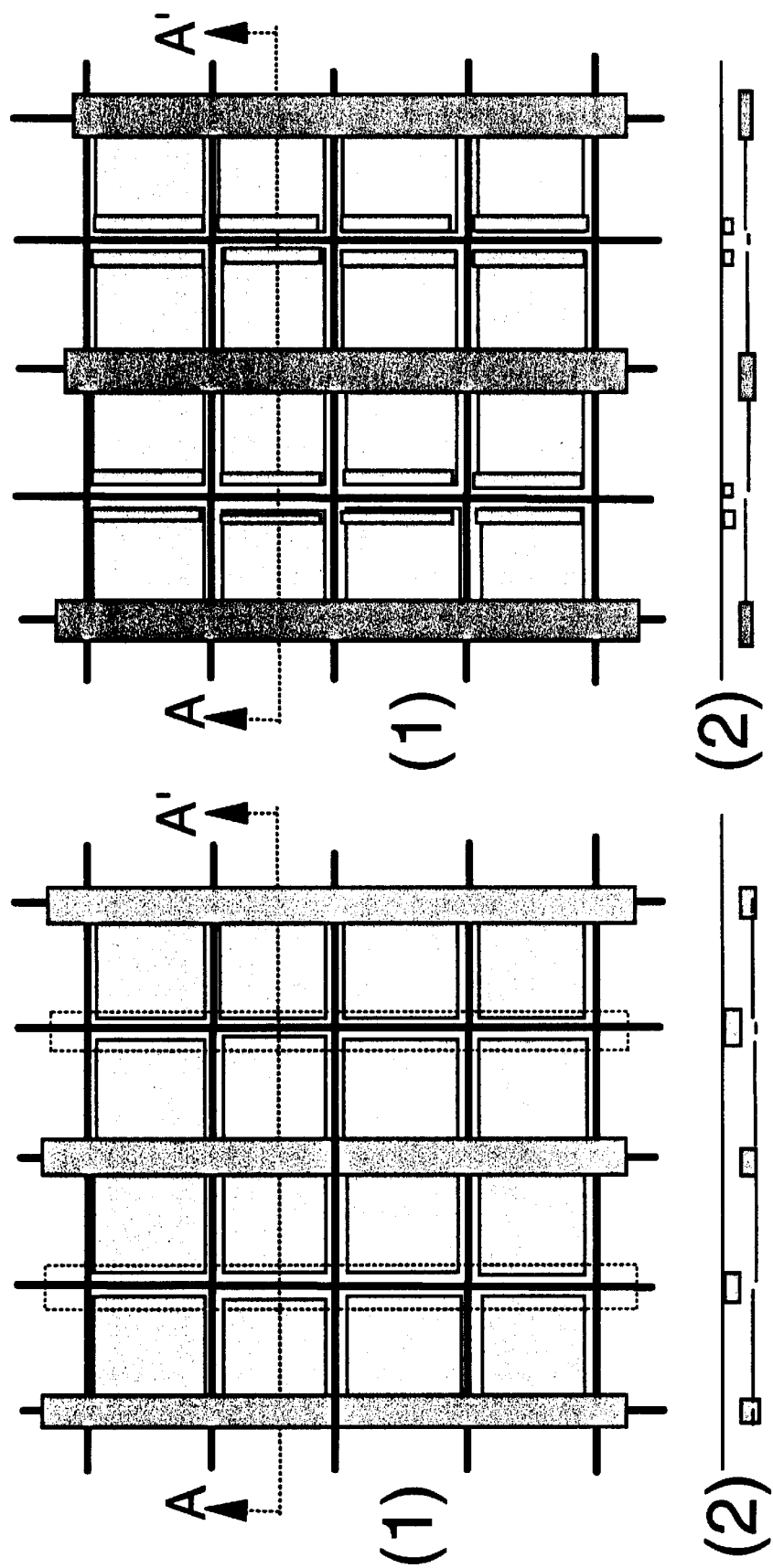
Figure 22:
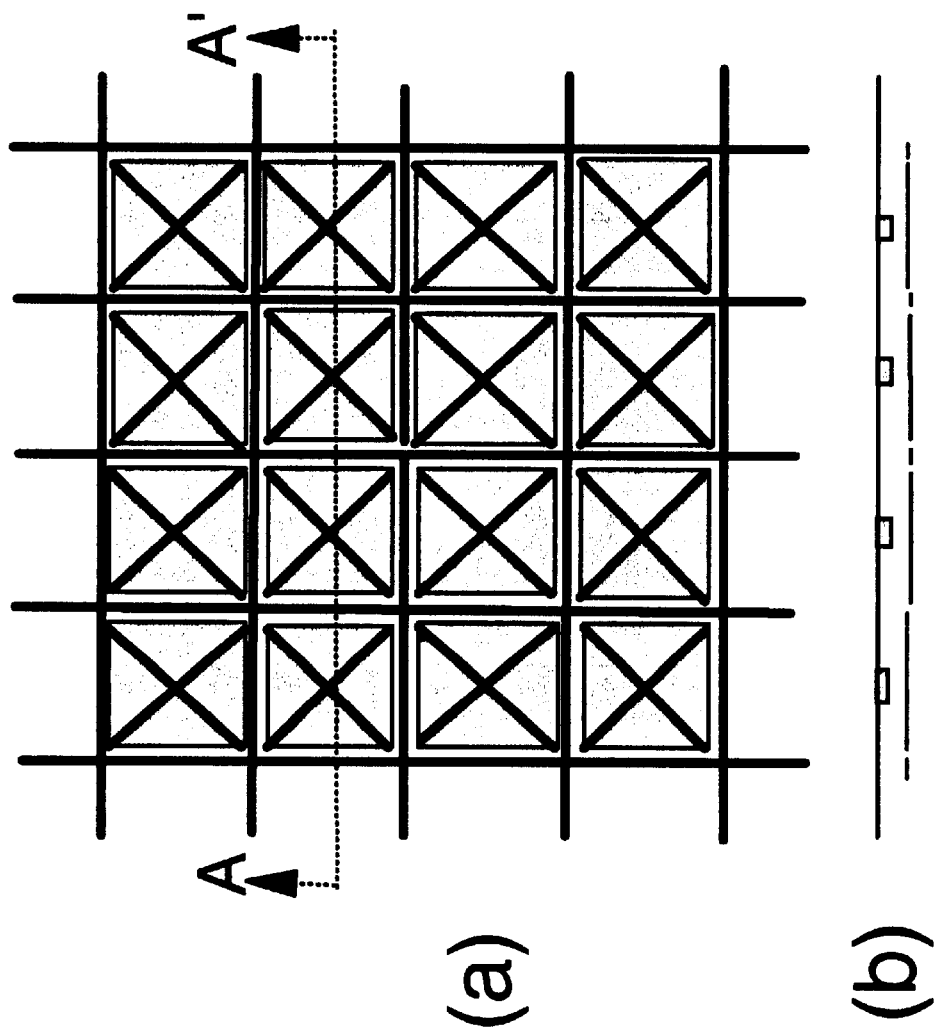
Figure 23:
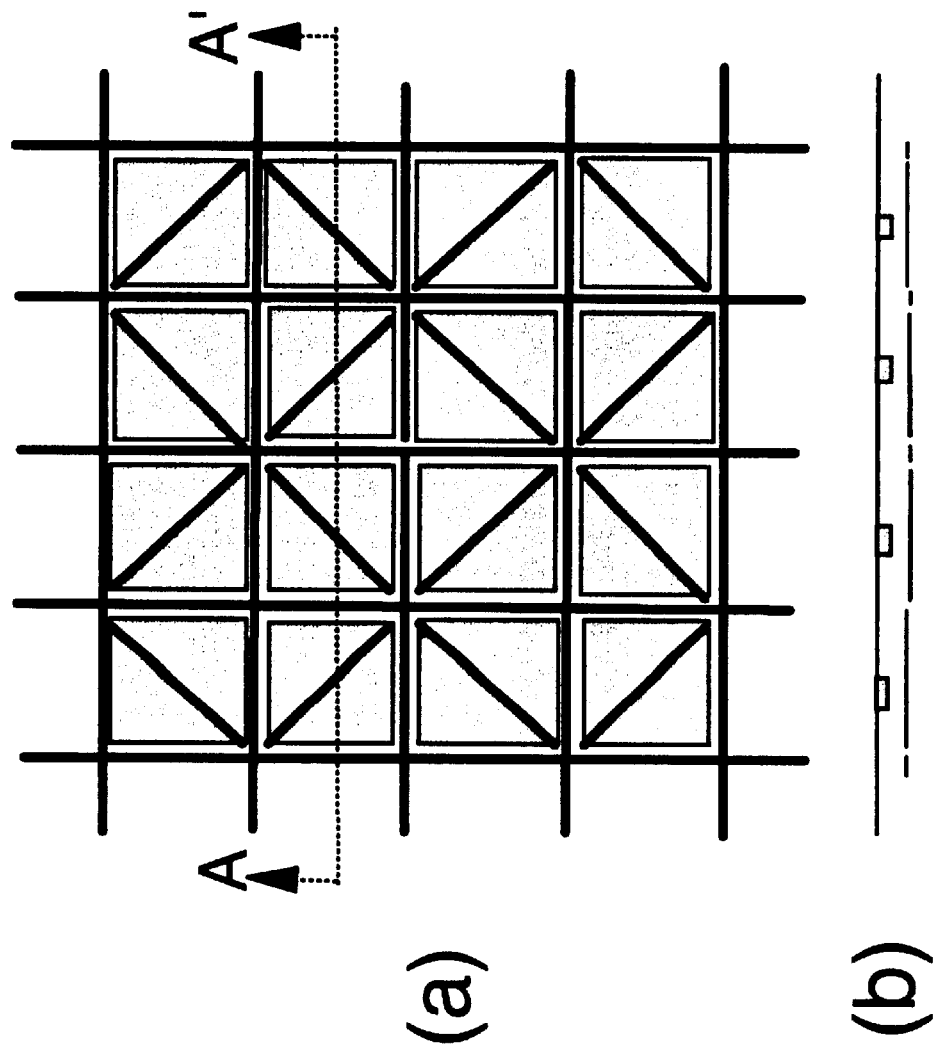
Figure 24:
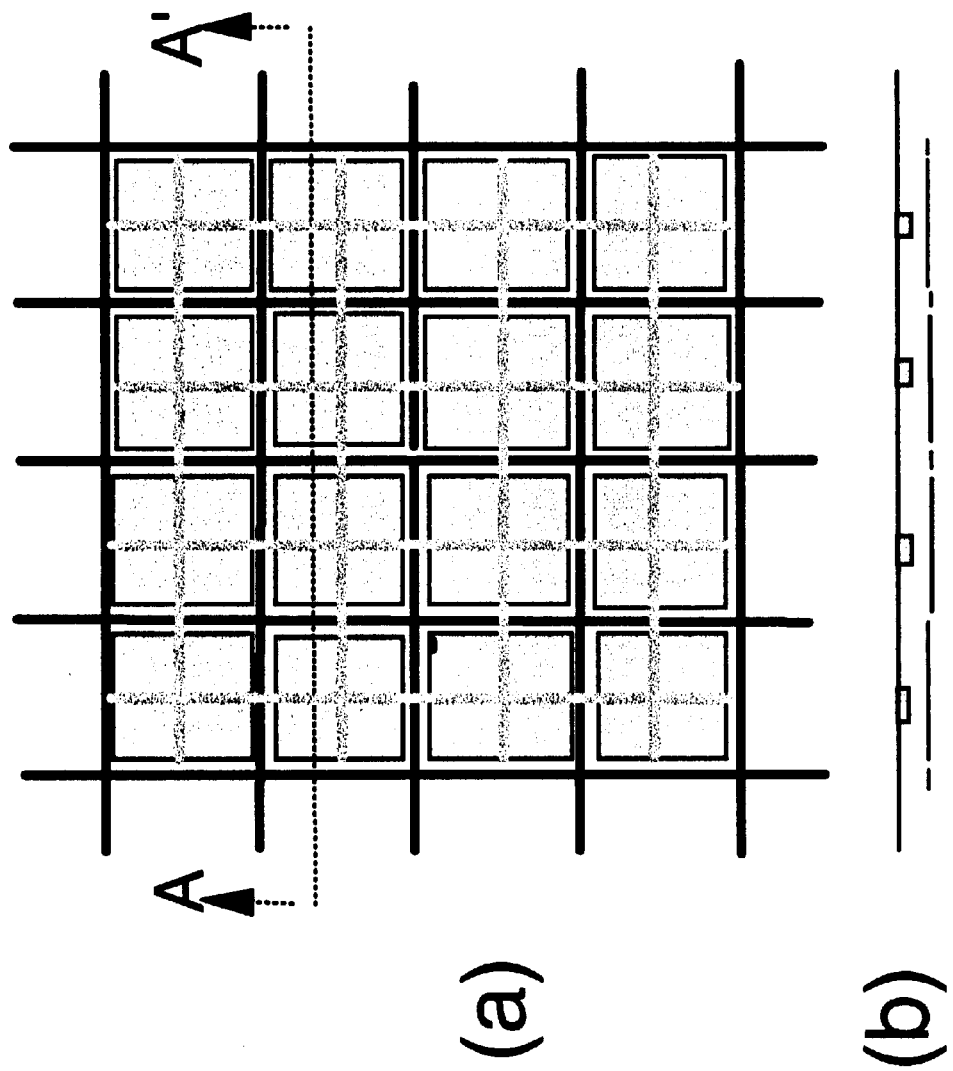

FIG. 19 shows the conventional square LC pixels with bus lines. FIGS. 20 and 21 show the new single domain cell designs. FIGS. 22 and 24 show the new four-domain cell design. FIG. 23 shows the new two-domain cell design.

Figure 25:
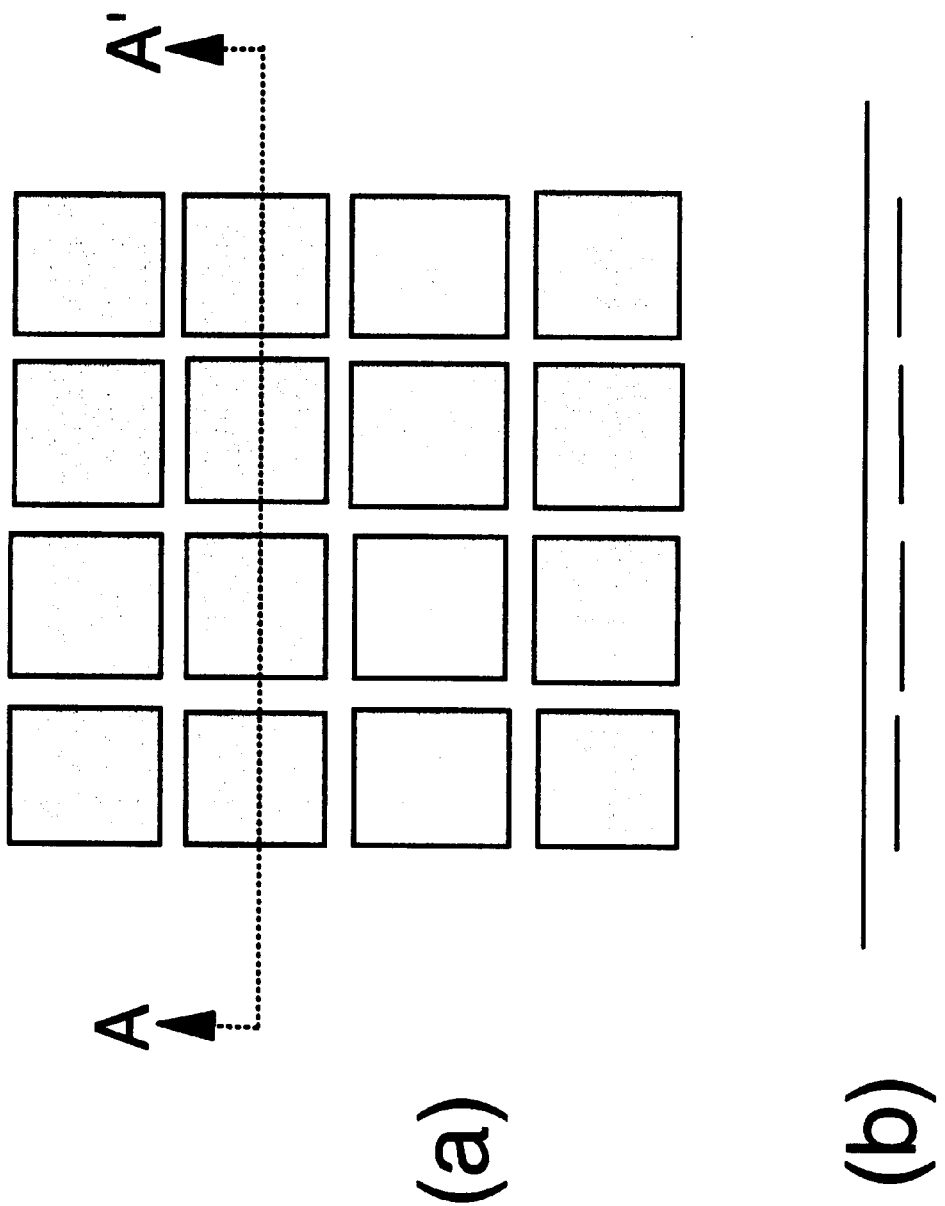
FIG. 25 illustrates conventional square LC cells for a reflective display design.

FIG. 25 shows conventional square LC cells for a reflective display in which the pixel electrode is a reflective metal and the bus lines are buried beneath the pixel electrodes.

Figures 26A, 26B:
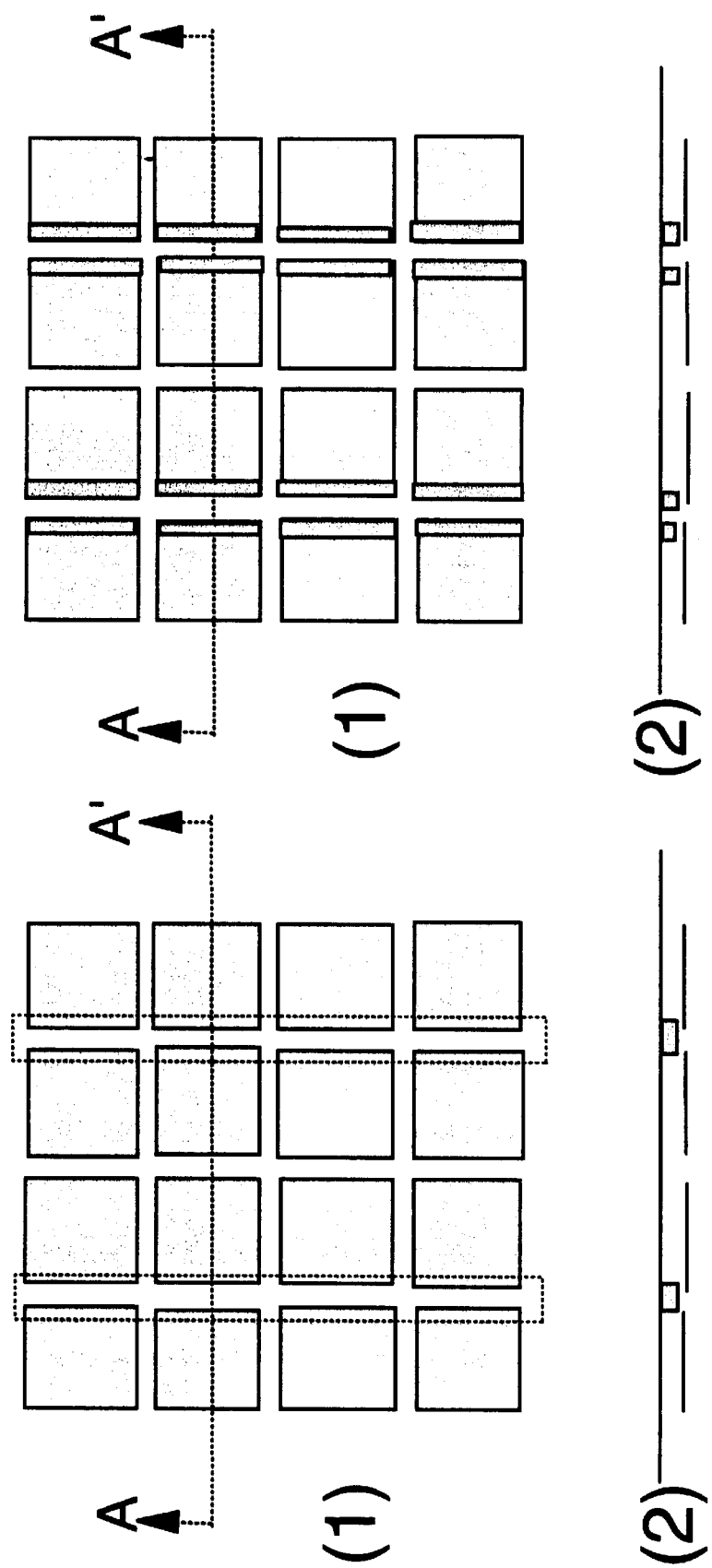
Figure 28:
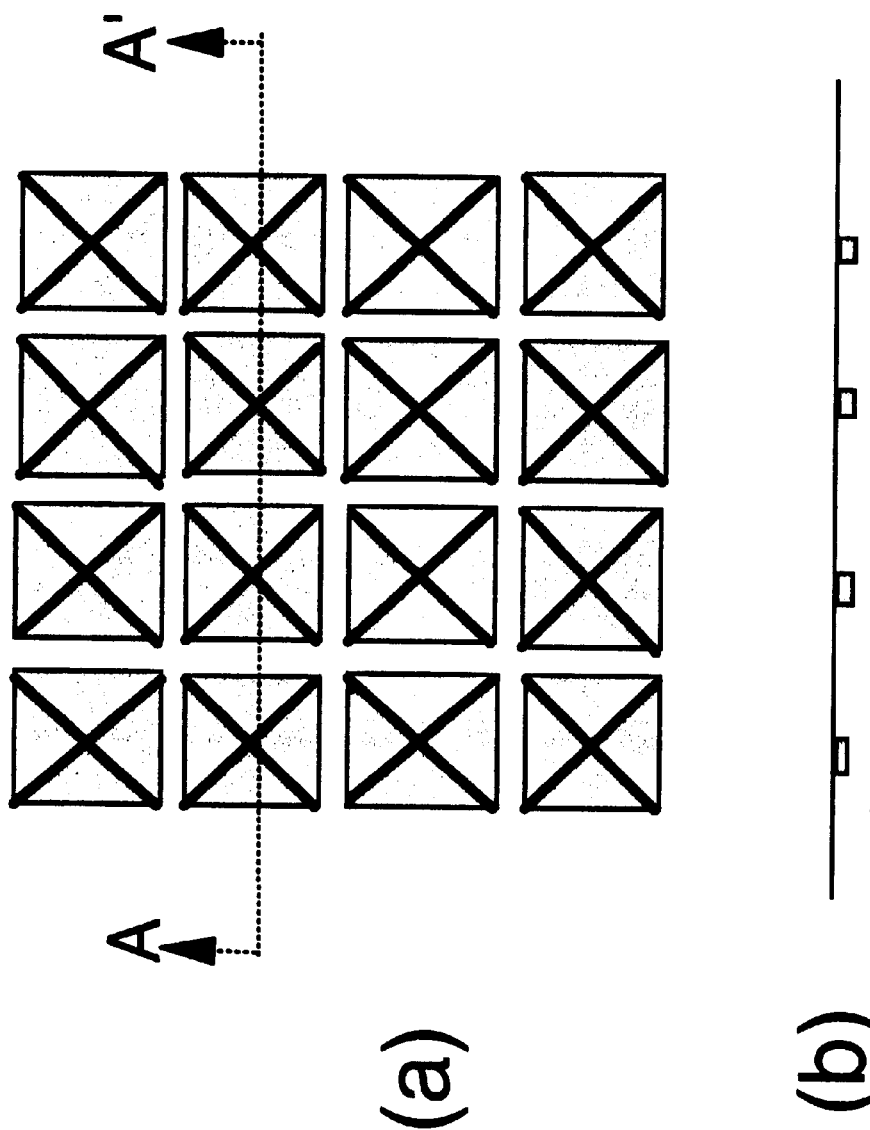
Figure 29:
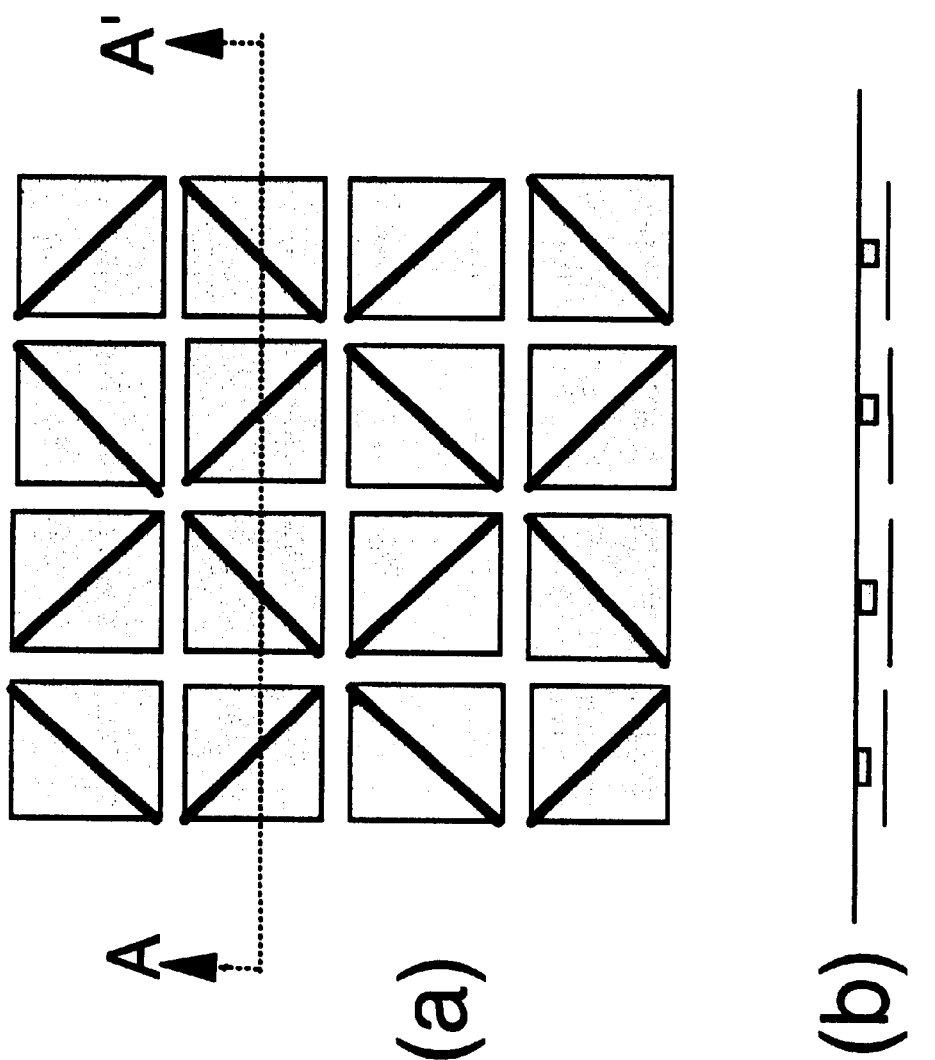
Figure 30:
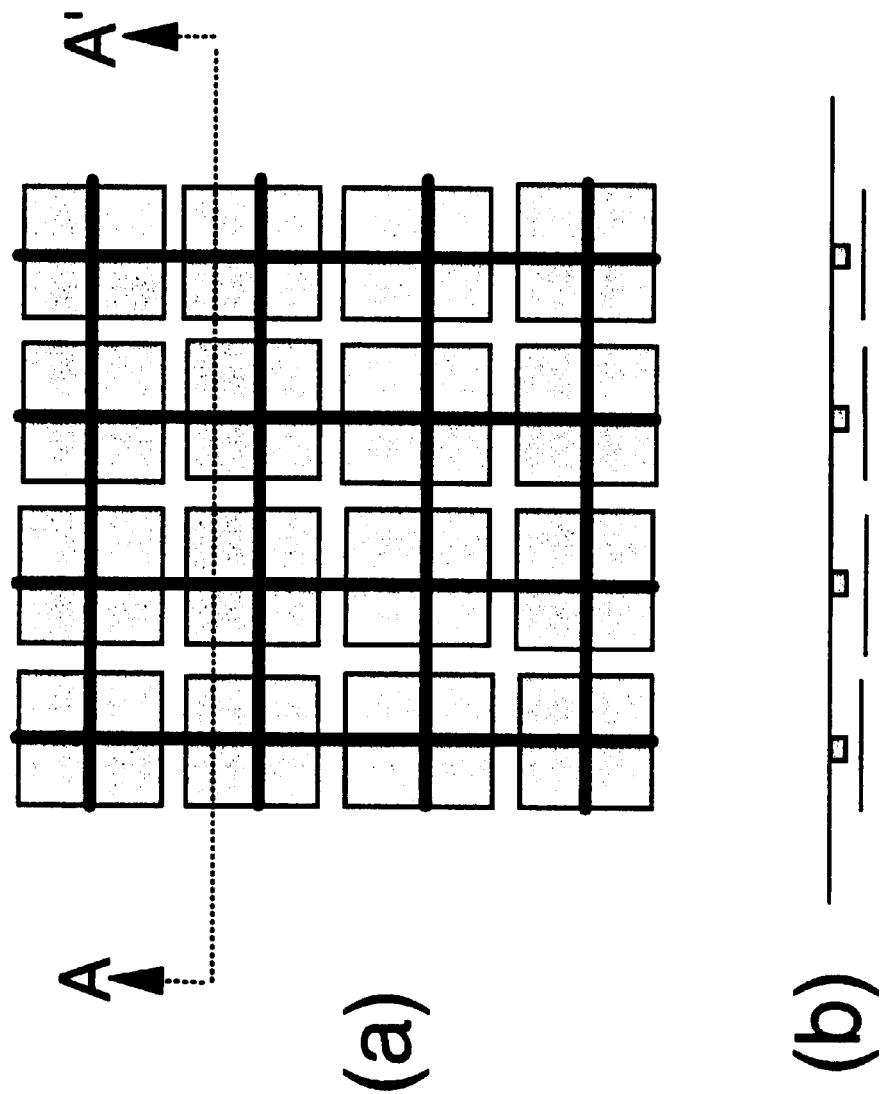

FIGS. 26–27 are for the new single domain (reflective display) designs, FIGS. 28 and 30 are for the new four-domain design and FIG. 29 is for a two-domain design.

While the invention has been described in terms of several preferred embodiments, those skilled in the art will recognize that the invention can be practiced with modification within the spirit and scope of the appended claims.

For example, the materials mentioned for the openings, cutouts, etc. for the conductive electrode in U.S. Pat. No. 5,309,264, incorporated herein by reference, can be used herein for similar benefit.

What is claimed is:

1. A liquid crystal display device, comprising:
    a first substrate;
    an alignment film deposited over said first substrate by one of physical and chemical vapor deposition;
    a second substrate coupled to said first substrate with said alignment film deposited over said second substrate and forming a cell gap; and
    a liquid crystal material formed in said cell gap,
    wherein said alignment film as deposited allows a truly vertical alignment of molecules of said liquid crystal material such that said molecules form an angle of substantially 90° relative to the substrate.

2. The device according to claim 1, wherein said alignment film is not subjected to a chemical or mechanical treatment.

3. The device according to claim 1, wherein said alignment film comprises one of an oxide and a nitride film.

4. The device according to claim 1, wherein said alignment film comprises an oxynitride film.

5. The device according to claim 1, wherein said alignment film comprises a carbon film.

6. The device according to claim 1, wherein said alignment film comprises a silicon film.

7. The device according to claim 1, wherein said first and second substrates comprise one of a glass substrate, a quartz substrate, a silicon-based substrate, and a plastic substrate.

8. A method for producing a liquid crystal display device, comprising:
    depositing an alignment film on first and second substrates by one of physical and chemical vapor deposition; and
    providing a liquid crystal material adjacent to said alignment film,
    wherein said alignment film as deposited allows a truly vertical alignment of molecules of said liquid crystal material such that said molecules form an angle of substantially 90° relative to the substrate.

9. The method according to claim 8, wherein said depositing said alignment film comprises depositing $SiO_2$ using an e-beam evaporation source in which the evaporant is $SiO_2$.

10. The method according to claim 8, wherein said depositing said alignment film comprises depositing $SiO_2$ by chemical vapor deposition.

11. The method according to claim 8, wherein said depositing said alignment film comprises depositing $SiO_2$ by radio frequency (RF) sputtering from a $SiO_2$ target.

12. The method according to claim 8, wherein said depositing said alignment film comprises depositing SiOx by plasma-enhanced chemical vapor deposition (PECVD).

13. The method according to claim 8, wherein said depositing said alignment film comprises depositing SiNx by plasma-enhanced chemical vapor deposition (PECVD).

14. The method according to claim 8, wherein said depositing said alignment Mm comprises depositing SiOxNy by plasma-enhanced chemical vapor deposition (PECVD).

15. The method according to claim 8, wherein said first and second substrates' comprise one of a thin film transitory (TFT) substrate and a color filter substrate, said method further comprising:
    applying a seal glue on one of the substrates;
    spraying a spacer on the other substrate;
    assembling and pressing the substrates, to form an assembled empty cell; and filling the empty cell with a negative dielectric anisotropic liquid crystal (LC) material, wherein a cell gap is within a range of about 1 μm to about 10 μm.

16. The method according to claim 8, wherein said first and second substrates comprise one of a glass substrate, a quartz substrate, a silicon-based substrate, and a plastic substrate.

17. A liquid crystal display device, comprising:
a first substrate;
an alignment film deposited over said first substrate by one of physical and chemical vapor deposition and ion beam treated;
a second substrate coupled to said first substrate with said alignment film deposited over said second substrate and then ion beam treated therebetween and forming a cell gap; and
a liquid crystal material formed in said cell gap, said alignment film allowing a tilted vertical alignment of molecules of said liquid crystal material such that said molecules have a pretilt angle of 0.5 to 10 degrees from a substrate normal direction.

18. The device according to claim 17, wherein said first and second substrates comprise one of a glass substrate, a quartz substrate, a silicon-based substrate, and a plastic substrate.

19. The device according to claim 17, wherein said alignment film comprises an oxide film.

20. The device according to claim 17, wherein said alignment film comprises a nitride film.

21. The device according to claim 17, wherein said alignment film comprises au oxynitride film.

22. The device according to claim 17, wherein said alignment film comprises a carbon film.

23. The device according to claim 17, wherein said alignment film comprises a silicon film.

24. A method of forming a liquid crystal device comprising:
depositing, on at least one substrate, an a alignment film by one of physical and chemical vapor deposition;
treating said alignment film with an ion beam; and
providing a liquid crystal material adjacent to said alignment film, said liquid crystal material having a tilted vertical alignment having an angle of substantially 0.5 to 10° relative to the substrate normal.

25. The method according to claim 24, wherein said depositing includes:
depositing, on said at least one substrate, the alignment film for providing molecules of said liquid crystal material a truly vertical alignment having an angle of substantially 90° relative to the substrate.

26. The method according to claim 25, wherein said depositing said alignment film comprises depositing $SiO_2$ using an e-beam evaporation source in which the evaporant is $SiO_2$.

27. The method according to claim 25, wherein said depositing said alignment film comprises depositing $SiO_2$ by chemical vapor deposition.

28. The method according to claim 25, wherein said depositing said alignment film comprises depositing $SiO_2$ by radio frequency (RF) sputtering from a $SiO_2$ target.

29. The method according to claim 25, wherein said depositing said alignment film comprises depositing SiOx by plasma-enhanced chemical vapor deposition (PECVD).

30. The method according to claim 25, wherein said depositing said alignment film comprises depositing SiNx by plasma-enhanced chemical vapor deposition (PECVD).

31. The method according to claim 25, wherein said depositing said alignment film comprises depositing SiOxNy by plasma-enhanced chemical vapor deposition (PECVD).

32. The method according to claim 24, wherein said at least one substrate comprises a thin film transitory (UT) substrate and a color filter substrate, said method further comprising:
applying a seal glue on one of the substrates, and spraying a spacer on the other substrate;
assembling and pressing the substrates, to form an assembled empty cell; and
filling the empty cell with a negative dielectric anisotropic liquid crystal (LC) material,
wherein a cell gap is within a range of about 1 μm to about 10 μm.

33. The method according to claim 24, wherein said at least one substrate comprises one of a glass substrate, a quartz substrate, a silicon-based substrate, and a plastic substrate.

34. The method according to claim 25, wherein said ion beam comprises ions of one of argon, oxygen, nitride, and helium.

35. The method according to claim 25, wherein an incident angle of the ion beam to the substrate surface is between about 5° to about 85°, an energy of the ion beam is from about 25 eV to about 500 eV, and a bombardment time is from about 5 seconds to a few minutes.

36. The method according to claim 25, wherein said at least one substrate comprises a thin film transitory (TFT) substrate and a color filter substrate, said method further comprising:
ion-treating both of said substrates;
applying a seal glue on one of the substrates, and spraying a spacer on the other substrate;
assembling and pressing the substrates, to form an assembled empty cell; and
filling the empty cell with a negative dielectric anisotropic liquid crystal (LC) material,
wherein a cell gap is within a range of about 1 μm to about 10 μm.

37. The method according to claim 26, wherein said device comprises a twist angle from 0° to 270° depending on an angle made by the ion beam bombardment directions on the substrates.

38. The method according to claim 25, wherein said liquid crystal device comprises a direct view TFT-LCD.

39. The method according to claim 25, wherein said liquid crystal device comprises a projection display.

40. The method according to claim 25, wherein said liquid crystal device comprises a transmissive display.

41. The method according to claim 25, wherein said liquid crystal device comprises a reflective liquid crystal display device.

42. A liquid crystal cell, comprising:
a first substrate;
a pixel electrode disposed above said first substrate;
a second substrate;
a transparent conductive electrode disposed below said second substrate;
a polymer ridge built on said conductive electrode;
a vertical alignment layer deposited by one of physical and chemical vapor deposition on both said pixel electrode and said conductive electrode, including the said ridge, said first and second substrates being coupled together to form a cell gap; and liquid crystal material disposed between said pixel electrode and said transparent conductive electrode, wherein said polymer ridge controls a tilt direction of said liquid crystal material.

43. The cell according to claim 42, wherein said polymer ridge comprises a transparent polymer material formed on said conductive electrode.

44. The cell according to claim 42, wherein said polymer ridge comprises an opaque polymer material formed on said conductive electrode.

45. The cell according to claim 42, wherein said liquid crystal material comprises negative dielectric anisotropic liquid crystal material.

46. The cell according to claim 42, wherein a cell gap between said first and second substrates is substantially within a range of about 1 $\mu$m to 20 $\mu$m.

47. The cell according to claim 42, wherein an optical anisotropy Dn is within a range of about 0.01<Dn<0.4.

48. The cell according to claim 42, wherein a ratio of d*Dn/1 is within a range of 0.1<d*:Dn/1<4.

49. The cell according to claim 42, wherein said cell is incorporated into a multi-domain liquid crystal display (LCD).

50. The cell according to claim 42, wherein said cell is incorporated into a single-domain liquid crystal display (LCD).

51. The cell according to claim 42, wherein said cell is incorporated into a high-density liquid crystal display (LCD).

52. The cell according to claim 42, wherein said cell is incorporated into a low-density liquid crystal display (LCD).

53. The cell according to claim 42, wherein said cell is incorporated into a direct view TFT-LCD.

54. The cell according to claim 42, wherein said cell is incorporated into a projection display.

55. The cell according to claim 42, wherein said cell is incorporated into a transmissive display.

56. The cell according to claim 42, wherein said cell is incorporated into a reflective liquid crystal display device.

57. The cell according to claim 42, wherein the alignment layer includes a ridge, and wherein the liquid crystal material in the vicinity of the ridge is initially aligned in an off-vertical orientation.

58. A method of forming a liquid crystal cell, comprising:

disposing a pixel electrode disposed above a first substrate;

disposing a transparent conductive electrode disposed below a second substrate; forming a polymer ridge on said conductive electrode and on said pixel electrode;

forming a vertical alignment layer by one physical and chemical vapor deposition on both said pixel electrode and said conductive electrode, including said ridge; and providing a liquid crystal material between said pixel electrode and said transparent conductive electrode.

59. The method according to claim 58, wherein said polymer ridge controls a tilt direction of said liquid crystal material.

60. The method of claim 59, wherein said forming said vertical alignment layer comprises:

depositing a diamond-like-carbon (DLC) film using one of chemical vapor deposition (CVD) and sputtering; and fluorinating the DLC.

61. The method according to claim 59, wherein said forming said vertical alignment layer comprises depositing $SiO_2$ using an e-beam evaporation source in which the evaporant is $SiO_2$.

62. The method according to claim 59, wherein said forming said vertical alignment layer comprises depositing $SiO_2$ by chemical vapor deposition.

63. The method according to claim 59, wherein said forming said vertical alignment layer comprises depositing $SiO_2$ by radio frequency (RF) sputtering from a $SiO_2$ target.

64. The method according to claim 59, wherein said forming said vertical alignment layer comprises depositing SiOx by plasma-enhanced chemical vapor deposition (PECVD).

65. The method according to claim 59, wherein said forming said vertical alignment layer comprises depositing SiNx by plasma-enhanced chemical vapor deposition (PECVD).

66. The method according to claim 59, wherein said forming said vertical alignment layer comprises depositing SiOxNy deposited by plasma-enhanced chemical vapor deposition (PECVD).

* * * * *